US007978120B2

(12) United States Patent
Longstaff

(10) Patent No.: US 7,978,120 B2
(45) Date of Patent: Jul. 12, 2011

(54) IMAGING SYSTEM AND METHOD

(76) Inventor: Ian Dennis Longstaff, West End (AU)

( * ) Notice: Subject to any disclaimer, the term of this patent is extended or adjusted under 35 U.S.C. 154(b) by 0 days.

(21) Appl. No.: 12/726,027

(22) Filed: Mar. 17, 2010

(65) Prior Publication Data

US 2010/0220001 A1 Sep. 2, 2010

Related U.S. Application Data

(63) Continuation of application No. PCT/AU2008/001386, filed on Sep. 18, 2008.

(30) Foreign Application Priority Data

Sep. 19, 2007 (AU) ................................ 2007905114

(51) Int. Cl.
*G01S 13/00* (2006.01)
(52) U.S. Cl. ............. 342/22; 342/59; 342/179; 342/180
(58) Field of Classification Search .................... 342/22, 342/59, 179
See application file for complete search history.

(56) References Cited

U.S. PATENT DOCUMENTS

| 3,842,417 | A | 10/1974 | Williams |
| 3,924,236 | A | 12/1975 | Earp et al. |
| 4,571,591 | A | 2/1986 | Valentino et al. |
| 4,612,547 | A | 9/1986 | Itoh |
| 5,038,150 | A | 8/1991 | Bains |
| 5,657,024 | A | 8/1997 | Shingyoji et al. |
| 5,790,071 | A | 8/1998 | Silverstein et al. |
| 6,104,346 | A | 8/2000 | Rudish et al. |
| 6,215,443 | B1 | 4/2001 | Komatsu et al. |

(Continued)

FOREIGN PATENT DOCUMENTS

WO   WO2007/082335 A1   2/2007

(Continued)

OTHER PUBLICATIONS

Donnet, B.J.; Longstaff, I.D., MIMO Radar, Techniques and Opportunities, Sep. 13-15, 2006, Radar Conference, 2006. EuRAD 2006. 3rd European , 112-115.*

(Continued)

*Primary Examiner* — Thomas H Tarcza
*Assistant Examiner* — Timothy A Brainard
(74) *Attorney, Agent, or Firm* — McGuireWoods LLP

(57) ABSTRACT

A radar imaging system for capturing an image of an object within an area of interest through at least one visual impairment. The radar imaging system comprises at least one radar array. The radar array includes a plurality of transmitter elements and a plurality of receiver elements for receiving a plurality of coded return signals from an object through the at least one visual impairment. The system further comprises at least one processor coupled to the transmitter and receiver elements, which is adapted to transmit a plurality of differently coded signals toward the object and the at least one visual impairment; decode the plurality of coded return signals received by each of the receiver elements; extract from the decoded return signals a multiplicity of captured signals for each transmitter to receiver path; focus the multiplicity of signals on all points of interest within the area of interest by aligning the multiplicity of captured signals to be co-incident from a particular point within the area of interest; and sum the aligned signals to produce an image of the object. A method for capturing an image of an object in an area of interest through at least one visual impairment is also provided.

33 Claims, 22 Drawing Sheets

U.S. PATENT DOCUMENTS

| | | | |
|---|---|---|---|
| 6,246,365 | B1 | 6/2001 | Tokoro |
| 6,437,750 | B1 | 8/2002 | Grimes et al. |
| 6,664,529 | B2 | 12/2003 | Pack et al. |
| 6,850,183 | B2 | 2/2005 | Reeves et al. |
| 7,391,362 | B2 | 6/2008 | Beckner |
| 2007/0139248 | A1 | 6/2007 | Baharav |
| 2007/0140174 | A1* | 6/2007 | Proctor, Jr. .................. 370/332 |
| 2008/0071169 | A1* | 3/2008 | Craddock et al. ............. 600/430 |
| 2008/0074307 | A1* | 3/2008 | Boric-Lubecke et al. ...... 342/28 |
| 2010/0164784 | A1 | 7/2010 | Longstaff |
| 2010/0204867 | A1 | 8/2010 | Longstaff |

FOREIGN PATENT DOCUMENTS

| | | |
|---|---|---|
| WO | WO 2007/045026 | 4/2007 |

OTHER PUBLICATIONS

Bo Liu; Chunlin Han; Benyong Liu, Receiving Signal Processing of Wideband MIMO Radar Based on Transmitting Diversity, Oct. 16-19, 2006, Radar, 2006. CIE '06. International Conference, 1-4.*

Vaskelainen, L.J., "Virtual Array Synthesis Method for Planar Array Antennas," IEEE Transactions of Antennas and Propogation, vol. 46, No. 3, Mar. 1998, pp. 391-396.

International Search Report and Written Opinion of the International Searching Authority from International Application No. PCT/AU2007/000033, mailed on Feb. 15, 2007.

International Search Report mailed Nov. 21, 2008 for PCT Application PCT/AU2008/001386.

Bliss, D.W. Forsythe, K. W.:"MIMO Radar Medical Imaging: Self Interference Mitigation for Breast Tumor Detection", Signals, Systems and Computers 2006, ACSSC '06. Fortieth Asilomar Conference on, Oct.-Nov. 2006, p. 1558-1562.

Liu, Bo Chan, Chunlin Liu, Benyoung: "Receiving Signal Processing of Wideband MIMO Radar Based on Transmitting Diversity", Radar, 2006. CIE '06 International Conference on. Oct. 2006. p. 1-4.

Bliss, D.W. Forsythe, K.W..: "Multiple-Input Multiple Output (MIMO) Radar and Imaging: Degrees of Freedom and Resolution", Signals, Systems and Computers 2003, Conference Record on Thirty Seventh Asilomar Conference on, Nov. 9-12, 2003, p. 54-59 vol. 1.

Chu-Yang Chen Vaidyanathan, P.P.: "A Subspace Methodfor Mimo Radar Space-Time Adaptive Processing" Acoustics, Speech and Signal Processing, 2007. ICASSP 2007. IEEE International Conference on. Apr. 15-20, 2007, vol. 2, p. II-925-928.

IEEE Xplore Release 2.5; http://ieeexplore.ieee.org/xpls/absprintf.jsp?arnumber=1291865; Multiple-Input Multiple Output (MIMO) Radar and Imaging: Degrees of Freedom and Resolution; Bliss D.W. Forsythe K.W. Lincoln Lab., MIT, Lexington MA,USA, Nov. 2003.

IEEE Xplore Release 2.5; http://ieeexplore.ieee.org/xpls/absprintf.jsp?arnumber=4176830; MIMO Radar Medical Imaging: Self Interference Mitigation for Breast Tumor Detection; Bliss, D.W. Forsythe, K.W. MIT Lincoln Laboratory, Lexington, MA, Nov. 2006.

IEEE Xplore Release 2.5; http://ieeexplore.ieee.org/xpls/absprintf.jsp?arnumber=4217561; A Subspace Method for MIMO Radar Space-Time Adaptive Processing; Chun-Yang Chen Vaidyanathan, P.P. Dept of Electr. Eng., California Inst of Technol., Pasadena CA, Apr. 2007.

IEEE Xplore Release 2.5; http://ieeexplore.ieee.org/xpls/absprintf.jsp?arnumber=4148263; Receiving Signal Processing of Wideband MIMO Radar Based on Transmitting Diversity; Liu, Bo Han, Chunlin Liu Benyong Institute of Electronic Engineering, University of Electronic Science and Technology of China, Chengdu, China, Oct. 2006.

* cited by examiner

IMAGING SYSTEM AND METHOD

CROSS REFERENCE TO PRIOR APPLICATIONS

This application is a continuation of International Application PCT/AU2008/001386, published as WO 2009/036507, with an international filing date of Sep. 18, 2008, which claims priority from Australian Patent Application No. 2007/905114, filed Sep. 19, 2007, all of which are hereby incorporated by reference for all purposes as if fully set forth herein

BACKGROUND OF THE INVENTION

1. Field of the Invention

The present invention relates to a radar imaging system and method for real-time or near real-time video imaging. In particular although not exclusively the present invention relates to a radar imaging system and method, for security screening and the like.

2. Discussion of the Background Art

Persons entering highly secure areas are often required to undergo some form of screening to ensure weapons or explosives are not being carried. These security concerns have led to the development of various techniques designed to discover undesirable objects hidden under a persons clothing.

One common process used to screen people entering a secure which has been used to good effect is the pat-down technique. Literally this requires security personnel to pat-down by hand the body of the person of interest through their clothing. This process can be quite time consuming where large numbers are to be screened, and the body contact can be considered some people to be both intrusive and offensive. Another common screening technique involves the use of hand held or walk-through metal detectors. Essentially these detectors rely on measuring induced currents in any metal object within range which is typically very short. Thus such detectors are not readily suited to applications where screening at a distance is desirable. Furthermore the detectors are only cable of detecting metal objects and fail to detect objects composed of ceramics e.g. ceramic knives, plastics or the like which can be a security concern.

It is generally known that electromagnetic (em) radiation in the millimetre wavelength of the spectrum readily penetrates through clothing. Likewise both microwave and x-rays also readily penetrate through articles of clothing as well as dust and smoke. X-rays have proved effective but are not acceptable in public places because of their inherent radiation hazard. Low-level electromagnetic radiation emitted in the millimetre and microwave wavelengths of the spectrum poses no known radiation hazard and is widely accepted for mobile phone and wireless applications. As such these wavelengths are well suited for use in security imaging applications.

One technique that makes use of the fact that electromagnetic radiation penetrates clothing is based on the use of radiometers which image the natural electromagnetic radiation from the body. Differing surface temperatures, their emissivity, and the differing scatter from background electromagnetic radiation provide contrast which can be focussed to form an image. Typically a radiometer will detect electromagnetic radiation in the mm wavelength bands. A millimetre wave radiometer will typically use a fast mechanically scanned reflector antenna. These mechanical scanning systems are unable to obtain fine image resolution at distant ranges. This is because a relatively larger scanner is required and it is not feasible to scan these large antennas at the required speed. Mechanically scanned systems also have a problem with achieving a fast enough refresh rate to capture images of a walking person. Another problem with mechanically scanned antennas is that they only focus at one distance and with a narrow depth of focus. This requires the person being screened to remain stationary at the focal point in front of the scanner for the duration of the scan. Yet another problem with radiometer systems is their susceptibility to the natural sources of radiation which can be very variable and affect the image contrast.

Radar imaging systems provide a more consistent illumination of the object to be imaged and phased array radar technology has the potential to provide images with multiple depths of focus, at longer ranges, and with fast refresh times. However a conventional phased array requires the whole aperture to be filled with transmitter and receiver mm wave elements, leading to an excessive cost.

Alternatives to the conventional phased array have been described in the literature, especially systems for imaging in the near proximity to the antenna array with a sparse array system.

An early publication "Synthetic Aperture Pulse Echo imaging with a Rectangular Boundary Array" by Kozick, R J and Kassam. S A, in IEEE Transactions on Image Processing Vol 2 No 1 January 1993, describes the basic principles of pulse-echo imaging at finite ranges with an array of the form described in our patent application. Their paper describes the process of imaging with pulses emitted for each transmitter/receiver pair combination in turn for a rectangular array formed with a pair of parallel transmitter elements and a pair of parallel receiver elements. Whilst this describes a process for imaging in the near field, their approach is not suited to applications where objects being imaged might move during the process of collecting data from all the pair combinations in turn.

A recent International patent application WO 2007/045026 describes a Synthetic Aperture Perimeter Array formed using the principles as described by Hoctor and Kassam (Proc IEEE Vol 78, No 4 April 1990, p 735-752). This reference describes a rectangular boundary aperture using one pair of sides for transmission and the other pair for reception. In order to collect the data required to form the image a radar waveform generator is switched in sequence to the elements of the transmitter array whilst a radar receiver system is sequentially switched to each receiver element in turn. The application shows how the process synthesises virtual elements located midway between each transmitter/receiver pair which can be processed in the manner of a filled array for imaging a distant scene. However the technique of synthesising a filed array in this manner is only applicable to the far field and will not focus in the near field. The technique described in WO 2007/045026 is not able to image a walking person for security screening applications. This is because typical walking movements will change signal phases over the time required to collect data from all transmitter and receiver combinations. This corrupts the focussing process. In contrast the technique described in our invention overcomes or at least ameliorates this problem.

The array described in WO 2007/045026 is primarily focused in the far field. For security scanning and other such applications the array must be focussed in the near field. WO 2007/045026 provides no teaching as to how this may be accomplished with an array of this type. This process of synthesising virtual elements and using these for imaging is not valid in the near field. The notion of synthesised virtual elements is only valid for imaging very distant scenes.

Clearly it would be advantageous to provide a radar based imaging system that provides a relatively high refresh rate and which is capable of focussing on all distance, whilst achieving fine resolution in the vicinity of the radar and at longer distances.

SUMMARY OF THE INVENTION

Disclosure of the Invention

Accordingly in one aspect of the present invention there is provided a radar array for use in an imaging system, said radar array comprising:
- a plurality of transmitter elements;
- a plurality of receiver elements for receiving a plurality of coded return signals from one or more objects within an area of interest; and
- at least one processor coupled to the transmitter and receiver elements said processor being adapted to:
  - stimulate differently coded signals from each of the transmitter element;
  - decode the plurality of coded return signals received by each of the receiver elements;
  - extract from the decoded return signals a multiplicity of captured signals for each transmitter to receiver path;
  - focus the multiplicity of signals on all points of interest within the area of interest by aligning the multiplicity of captured signals to be co-incident from a particular point within the area of interest, and then summing the aligned signals to produce an image of the area of interest.

In yet another aspect of the present invention there is provided a radar imaging system comprising:
- at least one radar array including:
  - a plurality of transmitter elements;
  - a plurality of receiver elements for receiving a plurality of coded return signals, from an area of interest within range of the radar imaging system;
- at least one processor coupled to the transmitter elements for controlling the transmission of a plurality of coded pulses from said transmitters toward the subject of interest; and
- at least one processor coupled to the receiver elements said processor being adapted to:
  - decode the plurality of coded return signals received by each of the receiver elements;
  - extract from the decoded return signals a multiplicity of captured signals for each transmitter to receiver path;
  - focus the multiplicity of signals on all points of interest within the area of interest by aligning the multiplicity of captured signals to be co-incident from a particular point within the area of interest; and
  - sum the aligned signals to produce an image of the area of interest.

In yet another aspect of the present invention there is provided a radar imaging system for capturing an image of an object within an area of interest through at least one visual impairment, said radar imaging system comprising:
- at least one radar array said array including:
  - a plurality of transmitter elements;
  - a plurality of receiver elements for receiving a plurality of coded return signals from an object through said least one visual impairment;
- at least one processor coupled to the transmitter and receiver elements said processor being adapted to:
  - transmit a plurality of differently coded signals toward the object and said at least one visual impairment;
  - decode the plurality of coded return signals received by each of the receiver elements;
  - extract from the decoded return signals a multiplicity of captured signals for each transmitter to receiver path;
  - focus the multiplicity of signals on all points of interest within the area of interest by aligning the multiplicity of captured signals to be co-incident from a particular point within the area of interest; and
  - sum the aligned signals to produce an image of the object.

In a yet another aspect of the present invention there is provided a radar imaging system for capturing an image of an object within an area of interest through at least one visual impairment, said radar imaging system comprising:
- at least one radar array said array including:
  - a plurality of transmitter elements;
  - a plurality of receiver elements for receiving a plurality of return signals from an object through said least one visual impairment;
- at least one processor coupled to the transmitter and receiver elements said processor being adapted to:
  - transmit a plurality of differently coded signals toward the object and said at least one visual impairment;
  - decode the plurality of coded return signals received by each of the receiver elements;
  - synthesise a plurality of staring line arrays each array including a plurality of synthetic element; and
  - form an image of the object contained within the area of interest by summing suitably delayed signals from the plurality of transmitter to receiver paths In a further aspect of the present invention there is provided a method for capturing an image of an area of interest, said method comprising the steps of:
- transmitting a plurality of coded pulses from a plurality of transmitter elements toward the area of interest;
- receiving a plurality of coded return signals reflected from the area of interest;
- decoding the plurality of coded return signals received by each of the receiver elements;
- extracting from the decoded return signals a multiplicity of captured signals for each transmitter to receiver path;
- focusing the multiplicity of signals on all points of interest within the area of interest by aligning the multiplicity of captured signals to be co-incident from a particular point within the area of interest; and
- summing the aligned signals to produce an image of the area of interest.

In another aspect of the present invention there is provided a method for capturing an image of an object within an area of interest through at least one visual impairment, said method comprising the steps of:
- transmitting a plurality of coded pulses from a plurality of transmitter elements toward the area of interest;
- receiving a plurality of coded return signals reflected from the area of interest;
- decoding the plurality of coded return signals received by each of the receiver elements;
- extracting from the decoded return signals multiplicity of captured signals for each transmitter to receiver path;
- focusing the multiplicity of signals on all points of interest within the area of interest by aligning the multiplicity of captured signals to be co-incident from a particular point within the area of interest; and
- summing the aligned signals to produce an image of the object.

In a yet another aspect of the present invention there is provided a method of capturing an imaging of an area of interest, said method comprising the steps of:
- transmitting a plurality of coded pulses from a plurality of transmitter elements toward a subject of interest
- receiving a plurality of coded return signals reflected from the subject of interest;
- processing the received signals to synthesise a plurality of staring line arrays each array including a plurality of synthetic element;
- forming an image of the object of interest by summing suitably delayed signals from the plurality of transmitter to receiver paths.

Suitably the multiplicity of captured signals are aligned to be co-incident in phase (and in time if path lengths differ by more than the range resolution) prior to summing. The captured signals may also be weighted in amplitude and phase prior to summing in order to modify the characteristics of the focal point. Preferably the image is displayed as a rectified or power intensity version of the raw microwave image. Further processed may be the applied to the intensity image to detect bright points or shapes which might require further analysis or identification.

Where the required scene is in close proximity to the array any points so focussed will have a limited depth of focus, requiring the formation of a three dimensional representation of the scene and subsequent processing to extract a two dimensional version for display.

Preferably the transmitter and receiver elements arranged to form planar array wherein the transmitter and receiver elements are positioned adjacent to the array perimeter. The planar array may define any suitable closed planar shape such as a circle, square, rectangle, octagon or the like.

The plurality of pulses transmitted by the transmitters, each may have a different signature code allowing the receiving elements to separate out return signals for each transmitting element reflected by one or more objects within range. Such coding signatures include time division multiplexing (TDM), frequency division multiplexing (FDM), code division multiplexing (CDM), or combinations of these.

Preferably combinations of both code division multiplexing and time division multiplexing are used. Suitably the multiplexed sequence must be completed before a walking person has moved enough to de-focus the image. For proper focussing the person must move less than a small fraction of a wavelength, typically less than a tenth of a wavelength, during this interval. For a system operating at a wavelength of 1 cm the data capture must be completed within about one half of a millisecond.

Preferably the transmitted signals are a sequence of binary phase switched pulses, with a time gap between each pulse sufficient to allow reception of the reflected signals from the area of interest before the next pulse in the code is transmitted. Suitably the pulse length between 10 ns to 20 ns is utilised for the sequence of binary phase switched pulses. A pulse repetition interval of 200 ns may be employed to provide unambiguous reception for ranges of 30 m or more. The sequence of binary phase switched pulses may be a sequence of 32 pulses to allow for simultaneously transmission of a multiplicity of different code sequences.

Alternatively each signature code is a carrier frequency selected from a set of predetermined frequencies. Suitably the pulses are transmitted in the microwave or millimetre portions of the electromagnetic spectrum.

In yet another form of the invention the pulses may be transmitted in accordance with a frequency division multiplexing (FDM) scheme, wherein the carrier frequencies of the pulses are cycled incrementally after each transmission period, such that each transmitter element transmits a full set of pulses covering all the predetermined frequencies. Most preferably the pulses are transmitted in accordance with an orthogonal frequency division multiplexing (OFDM) scheme.

Preferably the number of frequency cycles L is equal to or greater than number of transmitter elements N. Suitably the transmission of the pulses is staggered, i.e. during the transmission each transmitter element transmits a different carrier frequency within the sequence of pulses to that of the adjacent transmitter element/s.

Where a frequency division multiplexing scheme is utilised to transmit the pulses, a constant frequency separation is employed between the carrier frequencies of each pulses (i.e. the spacing between the carrier frequencies of each pulse in the frequency domain is identical). Preferably a variety of pulse compression techniques such as step-frequency range compression can be employed to further improve range resolution.

Where a code division multiplexing scheme is utilised to transmit the pulse the chosen coding scheme should preferably have codes which produce low time sidelobes after matched filtering (range compression) and low or zero resultant if matched against others in the set used, for example Zero-Cross-Correlation codes. Alternatively selected pairs of Golay codes with similar characteristics could be used. Some codes combinations may inevitably have non-zero cross-correlation, but where necessary these can be mutually de-correlated on reception with a suitable matrix transform to diagonalise their co-variance matrix.

In the case where the system is employed to produce an image of an object through visual impairment, the visual impairment may be any medium capable of supporting electromagnetic propagation. The visual impairment may include environmental phenomena such as low visible light, complete darkness, a particulate clod such as a dust cloud, smoke, vapour clouds, a layer of earth such as thin films of mud or soil or the like. The visual impairment may also include items such as fabrics (e.g. articles of clothing), plastics or other synthetic films which may act to obscure a portion or the whole of the subject to be imaged.

Preferably the synthesis of the staring arrays is conducted in accordance with a coherent Multiple Input Multiple Output (MIMO) processing technique. Suitably the MIMO processing includes the steps of converting the distance between each transmitter element, and each receiver element to a delay time and then removing the delay time from the received signals, before weighting and summing the pulses and signals from all the transmitter and receiver element pairs.

If required, in order to speed the processing time, the multiplicity of signals can be grouped into those which require similar phase shifts to focus on a particular point within the area of interest. The complex signals in each grouping may first be summed and then the phase shift applied to the sum for that grouping. Subsequently the phase shifted groupings may be summed to complete the focussing on to a particular point in the scene. Suitably this process may be repeated for all points in the scene allows an image of the scene to be formed.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BRIEF DETAILS OF THE DRAWINGS

In order that this invention may be more readily understood and put into practical effect, reference will now be made to the accompanying drawings, which illustrate preferred embodiments of the invention, and wherein.

DETAILED DESCRIPTION OF EMBODIMENTS OF THE INVENTION

Figure 1:
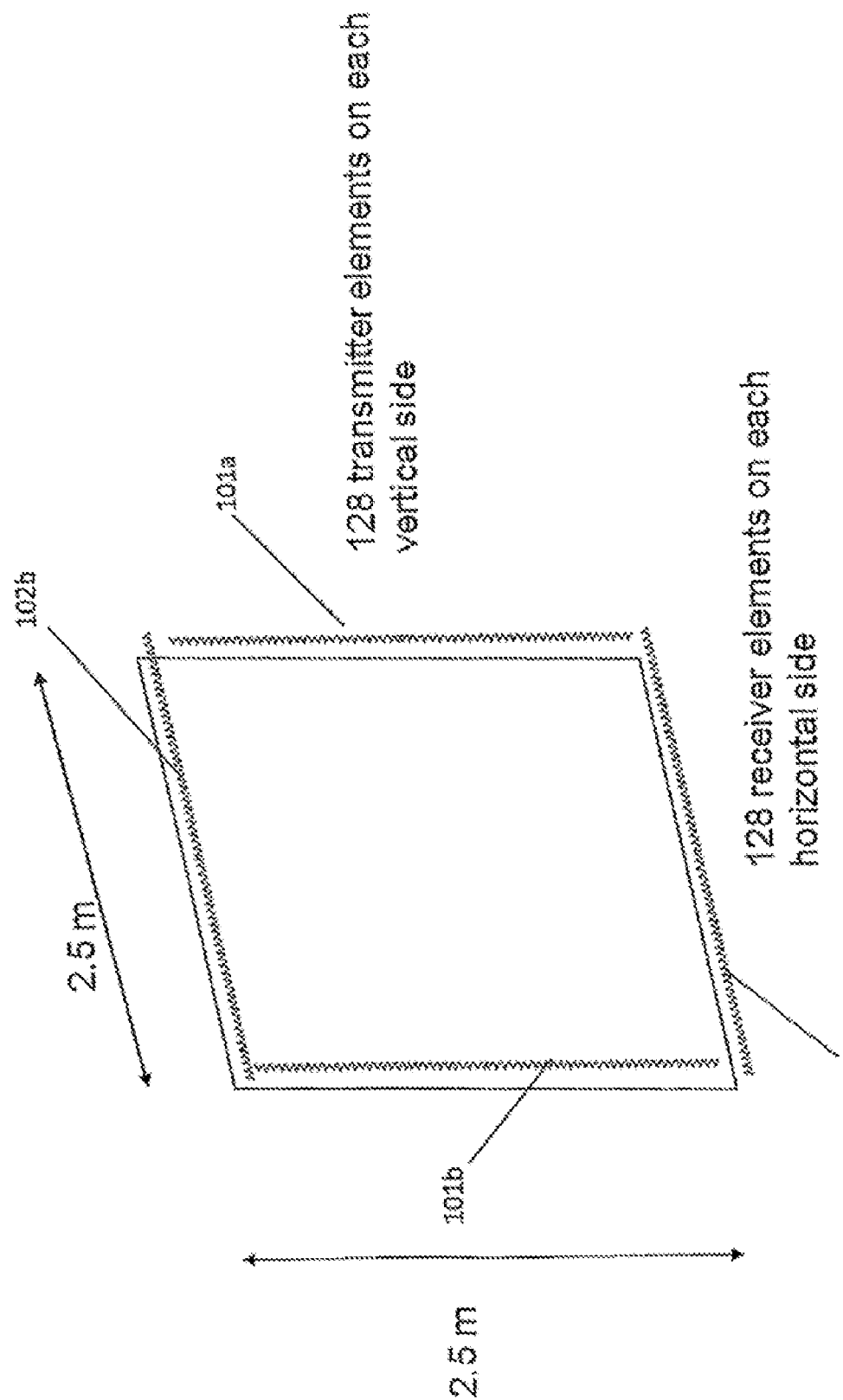
FIG. 1 is a schematic diagram of one possible configuration of a radar array for use in the imaging system of one embodiment of the present invention.

An example of one possible configuration of an imaging system according to one embodiment of the present invention is shown in FIG. 1. In this particular example the system is composed of a square perimeter antenna array 2.5×2.5 m nominal size. Disposed along each vertical edge 101a, 101b of the array is a set of N transmitter elements, with a set of M receiver elements being disposed along each horizontal edge 102a, 102b of the array. In this case each vertical transmitter sub-arrays contains 128 transmitter elements, likewise each horizontal receiver sub-arrays contains 128 receiver elements.

While the array shown in FIG. 1 is a square parameter array it will be appreciated by those skilled in the art that the array may be in the form of any suitable shape where multiple combinations of transmitter/receiver pairs allow the formation of a filled aperture. Such configurations might include a rectangle, parts of a rectangle forming a cross or L shape, a circle, octagon, or the like.

Figure 2:
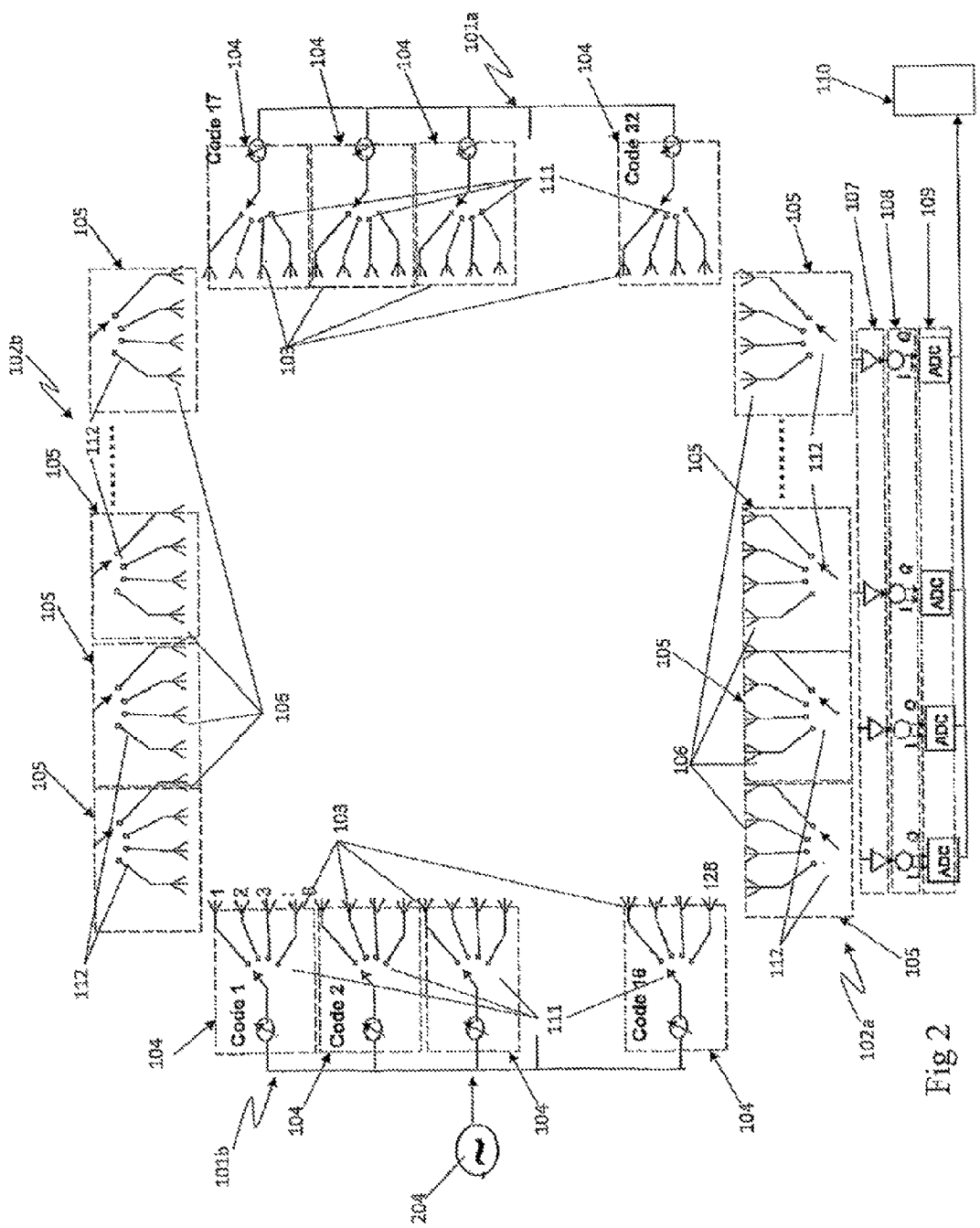
FIG. 2 is a further detailed view of the array configuration of FIG. 1.

FIG. 2 shows the arrangement of the transmitter 101a, 101b and receiver 102a, 102b sub-arrays in greater detail. In this case the 128 transmission elements 103 of transmitter sub-arrays 101a, 101b are clustered into transmission modules 104. In this instance each transmission module 104 includes 8 transmission elements 103, which yields at total of 16 transmission modules 104 per transmitter sub-array 101a, 101b. Each transmission module 104 is coupled to a switching network 111. The selection of which transmission elements 103 are active during the transmission cycle is determined by the switching network 111 which opens and closes the appropriate switches to activate the appropriate antenna element 103.

As with the transmission sub-arrays the 128 elements 105 of the receiver sub-arrays 102a, 102b are clustered into receiver modules 105. Each module 105 includes 8 receiver elements 106 which yields a total of 16 receiver modules 105 per receiver sub-array 102a, 102b. Each receiver module 105 is coupled to a switching network 112 which passes the signals received by the active receiver elements 106 to a series of Low Noise Amplifiers (LNA) 107. The output of each amplifier is the fed to an associated IQ Homodyne receiver 108. The demodulated signals from the IQ Homodyne receiver stage 108 then under go Analogue to Digital Conversion (ADC) 109 before being eventually analysed by Digital Signal Processor (DSP) 110.

Figure 3A:
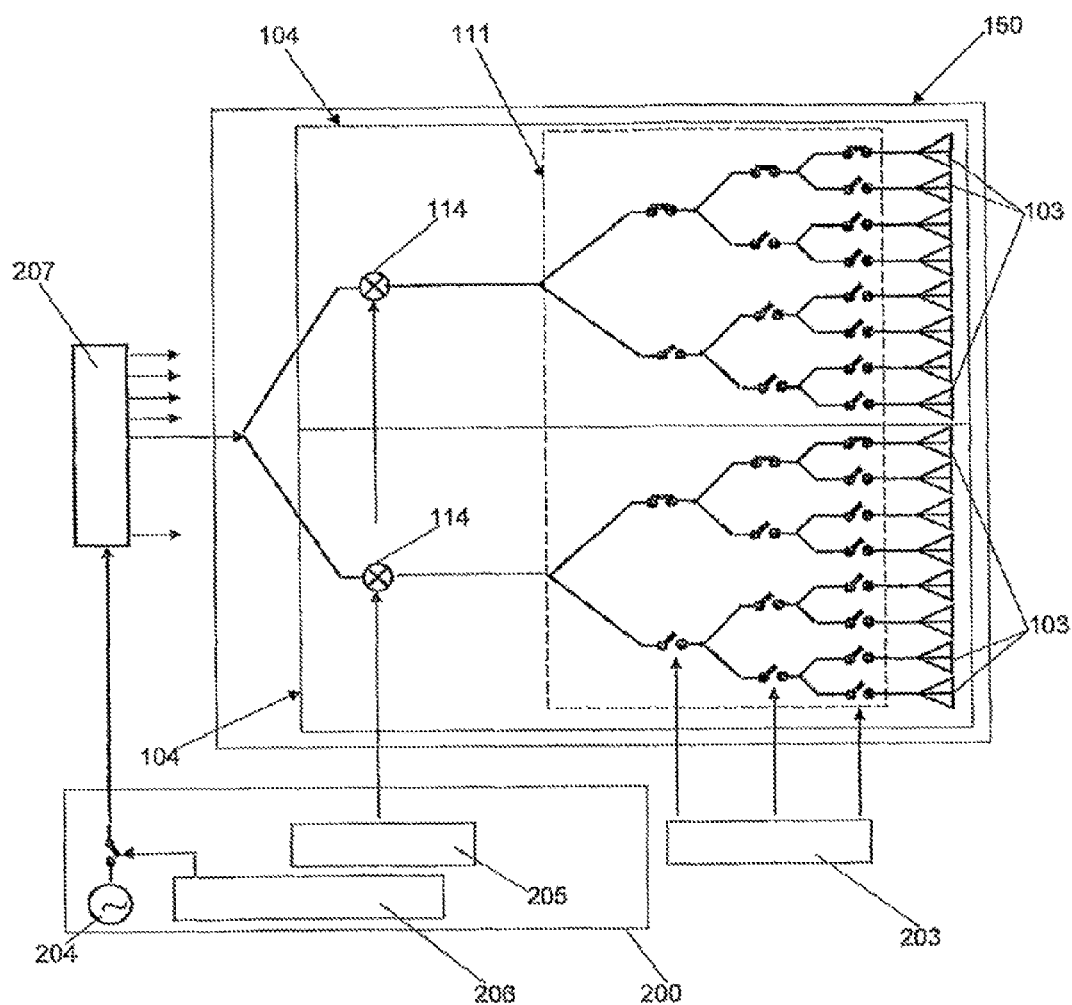
FIG. 3A is a schematic diagram of one possible configuration of a transmission module for use in the array configuration of FIG. 1.

A more detailed view of one possible arrangement for the transmission modules 104 which are used to form the transmission sub-arrays 101a, 101b is shown in FIG. 3A. In this example the two transmitter modules 104 are shown housed on a single microstrip array 150. Here the antenna elements 103 are in the form of patch antennas which are coupled to switching network 111. The switching network 111 is in turn coupled to mixers 114 and the element selection unit 203. As shown the mixers 114 modulate the desired signal coding scheme provided by the coding unit 205 onto the carrier pulses, which are fed to mixers 114 through waveguide 205 from source 204 housed within the master waveform generator 200. Pulse shaping may also be employed through a pulse shaper 206 which may be coupled between source 204 and waveguide 207. In the present case the pulse shaper 206 is employed to control the duration of each carrier pulse e.g. the switching rate of shaper 206 produces pulse of 10 ns duration.

The transmission of the coded pulses through each transmission module 104 and appropriate antenna element 103 is essentially controlled by the transmission element selection unit 203. The selection unit 203 is programmed to effectively open and close the appropriate series of selection switches within the switching network 111 based on a number of factors including the chosen coding scheme and other operational parameters of the radar system e.g. range resolution etc.

Figure 3B:
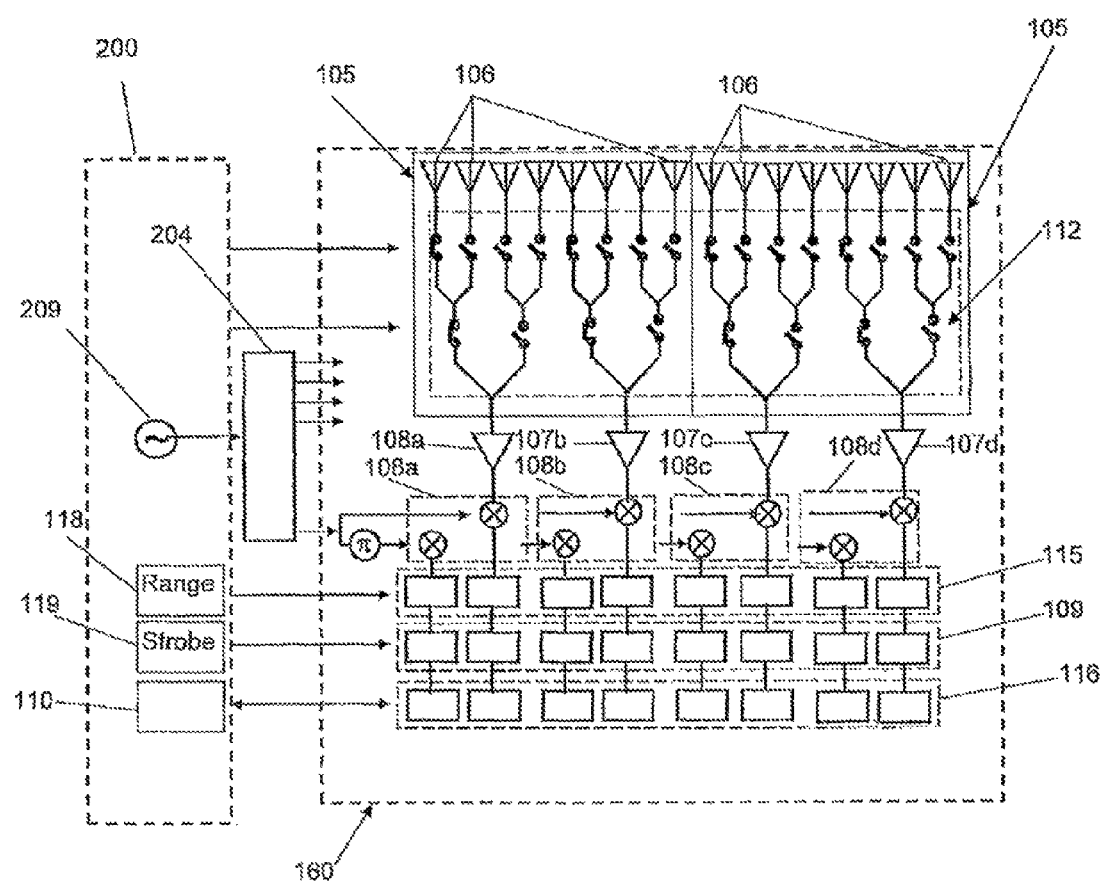
FIG. 3B is a schematic diagram of one possible configuration of a receiver module for use in the array configuration of FIG. 1.

A detailed view of one possible configuration of the receiver modules 105 which form the receiver sub-arrays 102a, 102b is shown in FIG. 3B. In this example two receiver modules are shown housed on a single microstrip array 160. As with the transmission element 103 the receiver elements 106 are in the form of patch antennas. As mentioned above receiver element 106 are coupled via a switching network 112 to a series of Low Noise Amplifiers (LNA) 107. As with the transmitter sub-array the selection of which receiver elements 103 are active during the receiving cycle is controlled by a receiver element selection unit 207.

As shown each receiver module is serviced by at least two LNAs 107a, 107b, 107c and 107d respectively, each LNA being associated with a bank of receiver elements 106 within the receiver module 105. The amplified signals from each of the LNAs 107a, 107b, 107c and 107d are then passed to respective IQ homodyne receivers 108a, 108b, 108c and 108d housed in the IQ homodyne receivers. As will be appreciated by those skilled in the art homodyne receivers require a reference signal of the same frequency carrier 204. In this particular example this reference signal 209 is provided from the master waveform generator 200 to each of the IQ homodyne receivers 108a, 108b, 108c and 108d 204 via waveguide 210. It would also be clear to those skilled in the art that the use of a higher transmitter power would eliminate the need for LNA's to perhaps reduce cost.

The demodulated signals from the IQ homodyne receivers 108a, 108b, 108c and 108d are then passed to a buffers 115a-115f within the sample and hold stage 115. At this stage range information 118 may be inputted. The received signals including any range information are then passed to a series of ADC 109a-109d. At this stage additional information on the strobe 119 may also be inputted. The resultant digital signals, along with any encoded range and strobe data, are then stored in data buffer 116 before being retrieved for further analysis by Digital Signal Processing unit 110.

In order to produce an image of the area of interest and a target utilising the array of FIG. 1 the system syntheses a staring array with resolution similar to a fully populated phased array of N×M elements. As discussed in the applicant's earlier filed international application PCT/AU2007/000033 which is herein incorporated by reference, arrays of synthetic elements can be produce when the reflected signals corresponding to each transmitted pulse can readily distinguished and separated at each of the receiver elements within the receiver array. That is each reflected signals is readily separable from the plurality of reflections received by each receiver element. This allows the far-field scene to be focussed using a two dimensional Fourier transform. This notion does not apply to systems imaging nearby scenes because the transmitter and receiver paths to are not parallel. The present invention requires the signals from all receiver elements to be separated by decoding into the individual signals from all the transmitters and to be focussed by time shifting, weighting, and adding these waveforms.

One approach to ensure ready separation of the received signals at each receiver element is to simply switch a signal pulse between each transmitter element in turn, with sufficient time spacing between the pulses to allow reception of the radar echo (i.e. applying Time Division Multiplexing). Again this method is described in the applicant's earlier international application PCT/AU2007/000033. Such an approach is an extremely viable for some applications. However, the time required to complete all path combinations is not suited to many real-time applications, such as imaging a walking person.

An alternative approach is to simultaneously transmit the plurality of pulses utilising code division multiplexing scheme. The advantage with such a transmission technique is that it completes the acquisition of all data from all path combinations in a much shorter time interval. Another advantage of this technique is that a range compression operation can be applied during the de-multiplexing process, so as to improve the range resolution and reduce clutter in the image. However, a potential drawback with the use of such a transmission scheme is that channel leakage can occur. Where a large number transmitter codes are used simultaneously there is the potential these codes to leak into one another during de-multiplexing thereby accumulate unwanted interference. The number of codes can be minimise by using a combination of both code division multiplexing and time division multiplexing whereby all transmissions can be completed in 500 microseconds. Likewise the number of receiver channels can be minimised by switching to subsets and repeating the transmitter waveforms for each subset in turn.

This technique of simultaneously transmitting separately coded channels from multiple transmitters for reception by multiple receivers is commonly called coherent Multiple-Input Multiple-Output (MIMO) processing. As above the generation of synthetic elements under MIMO processing is only possible where each receiver element is able to separate the return signals in order to match them to the corresponding signal from each transmitter element (i.e. a form of multistatic processing within the array itself). Under the coherent MIMO approach the generation of synthetic elements involves transmitting a plurality of signal pulses in accordance a chosen coding scheme. It will be appreciated by those of ordinary skill in the art that there are a number of coding schemes which could be used under the coherent MIMO technique such as Frequency Division Multiplexing (FDM), Orthogonal Frequency Division Multiplexing (OFDM), step frequency sequences and versions of code division multiplexing (CDM) such as binary phase modulation, quadrature phase modulations or the like could be utilised. In the present application the chosen coding scheme should preferably have codes which produce low time sidelobes after matched filtering (range compression) and low or zero resultant if matched against others in the set used. For example Zero-Cross-Correlation codes or selected pairs of Golay codes with similar characteristics could be used.

One approach to image generation under the MIMO technique for the array of FIG. 1 is to simultaneously apply to each of the transmitter elements on each side of the array, a short pulse of wavelength in the order of a few millimetres, e.g. 35 GHz pulse for a duration of approximately 10 nanoseconds. The phase of the pulse at each transmitter element can be set to be either in-phase or anti-phase with the source. The selection of which transmitter elements are set in phase and anti-phase can be done in accordance with the selected coding scheme. For example a unique code sequence can be assigned to each transmitter element. The transmission of the pulses is then repeated at intervals defined by the required range ambiguity, e.g. for a short range system the pulses may be transmitted at a rate of 100 nanoseconds. Alternatively where short range operation requires only low transmitter power, and where the transmitter power does not obscure the received signals, the code sequence can be transmitted as a continuous wave signal.

An alternative approach to the coding scheme discussed above would be to apply the codes to smaller sections of the array in sequence. This would be of value for arrays with large numbers of elements and where a sufficient number of different codes with low self and cross sidelobes are not available.

In either case the reflected signal from the subject corresponding to each pulse transmitted by each of the transmitter elements can be captured by receiver elements between each bit of the code and separated out using matched filtering. That is the signals from all paths between all transmitters, via the scene, to all receivers are separated and matched to the appropriate transmitter before being processed.

To form the image the round distance between transmitter elements, the pixel being measured and each receiver element must be known. These distances are converted to delay time which must be removed from the received data set to cause alignment at the pixel point being imaged. This is repeated for each point in the scene at incremental angles and distances over the volume to be imaged. Each sum represents the image intensity at that point. The signals to be summed can be weighted to form beams and pulses with specified sidelobe characteristics, such as low sidelobes in the point spread function.

Figure 4A:
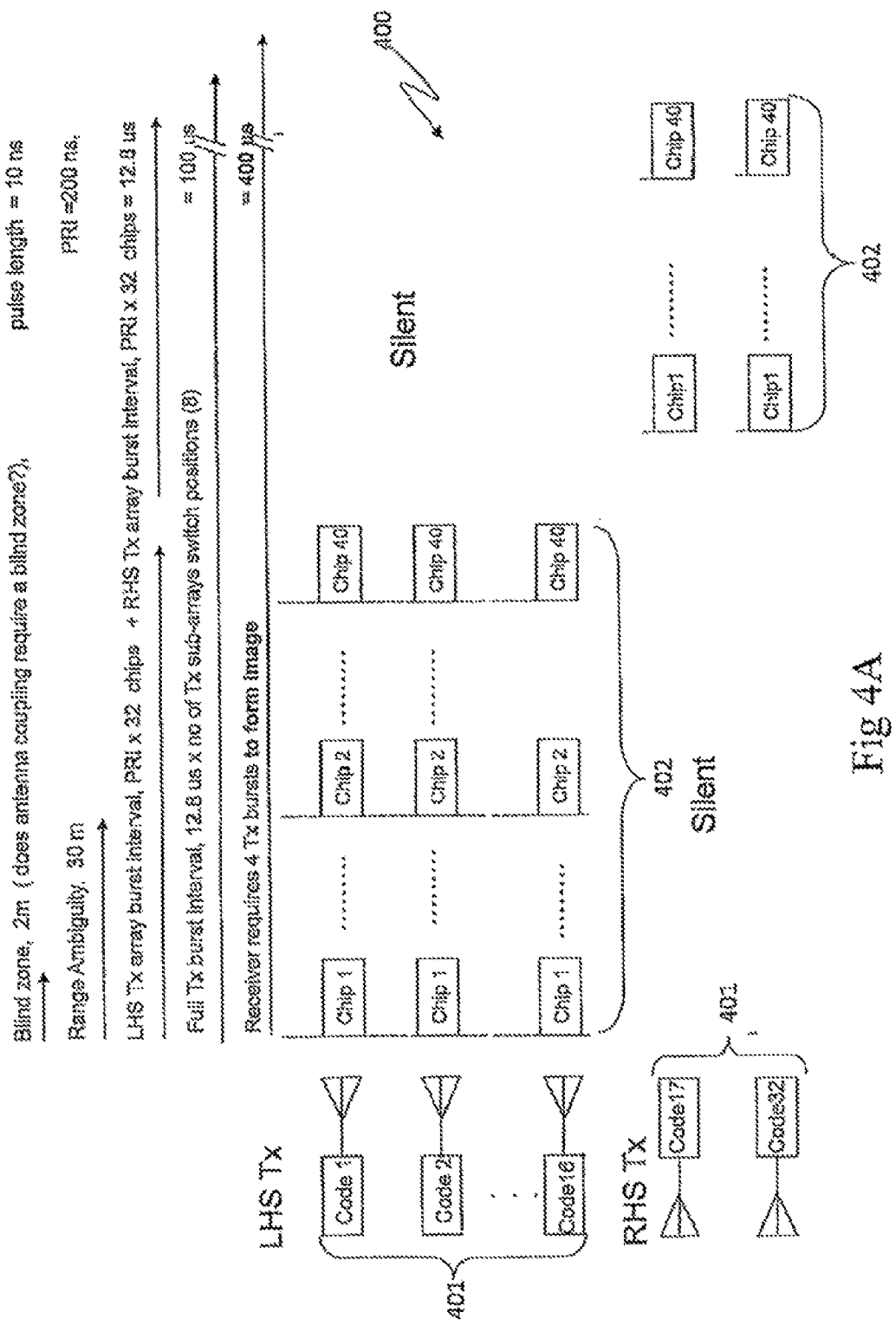
FIG. 4A is a an example of one possible configuration of a transmission wave form according to one embodiment of the present invention.

An example of suitable transmission waveforms which can be employed in an imaging system utilising the array of FIG. 1 according to one embodiment of the present invention is shown in FIG. 4A. In all the system exemplified in this embodiment utilises 32 codes being split between the left hand transmitter sub-array 101a and the right hand transmitter sub-array 101b. The left hand sub-array in this case transmits codes 1 to 16 401 while the right hand sub-array 101b transmits the codes 17 to 32 402. Each code 401 is transmitted from the respective transmitter element utilising a utilising a set of pulses 402 of 10 ns duration with a pulse repetition interval of 200 ns. This allows for the completion of a 32 coded pulse pairs in approximately 12 µs. This must then be repeated for each transmitter switch position which results in a transmission burst interval of approximately 100 µs. In order to form the image the receiver must capture at least four transmission burst. Thus an imaging system utilising this particular waveform can form an image within approximately 400 µs.

Figure 4B:
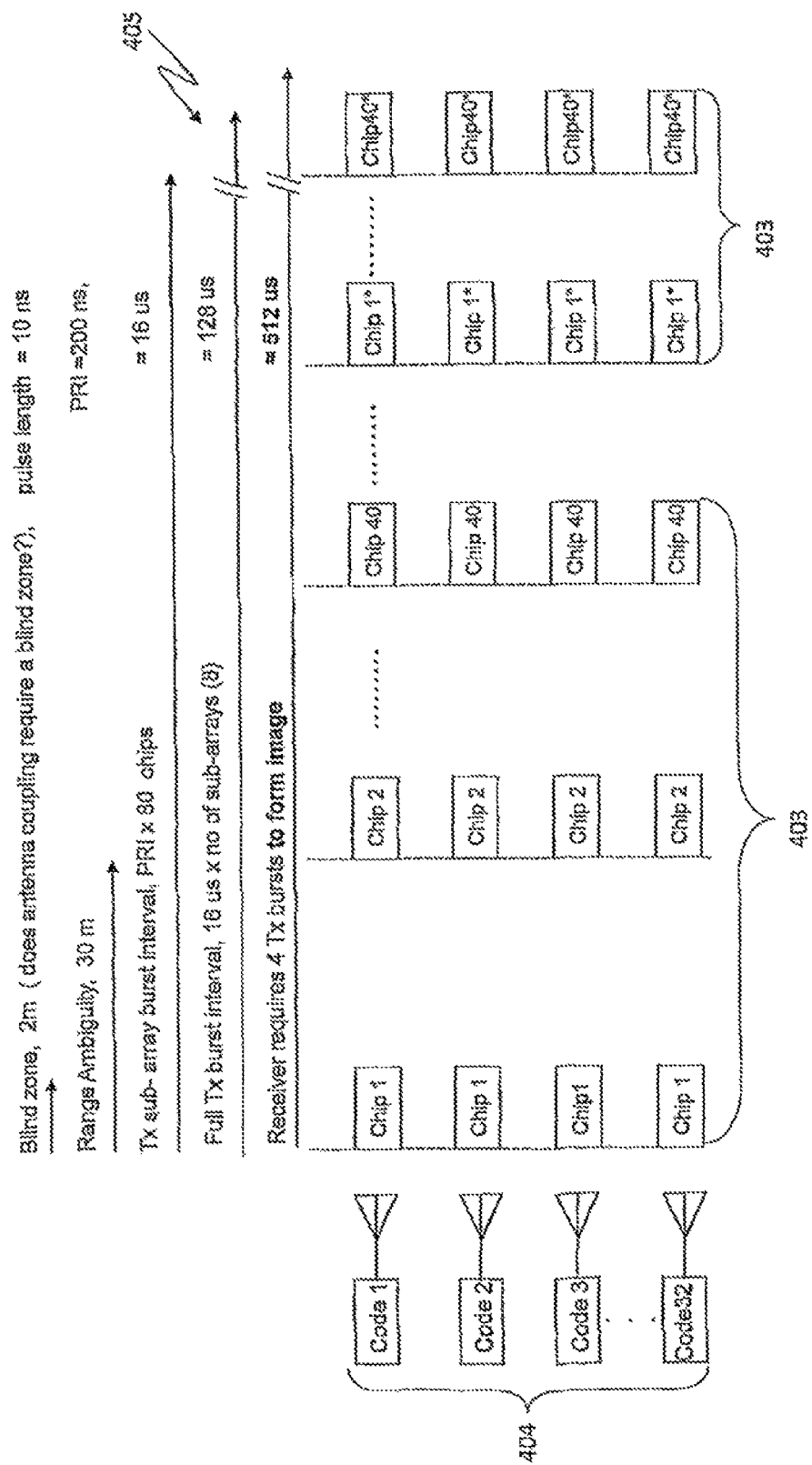
FIG. 4B is a an example of one possible configuration of a transmission wave form according to one embodiment of the present invention.

An alternate transmission waveform is shown in FIG. 4B, in this example selected pairs of Golay codes 403 are utilised. In the present case 40 Golay codes pairs 403 are used. Again transmission of the scheme utilises a set of 32 pulses 404 of 10 ns duration, with a pulse repetition interval of 200 ns onto which the 40 Golay codes 403 are modulated. This allows the completion of the Golay code pairs 404 in 16 µs. This must then be repeated for each transmitter switch position which results in a transmission burst interval of approximately 128 µs. This allows the system to capture the required information to form the image in approximately 512 µs.

Figure 5:
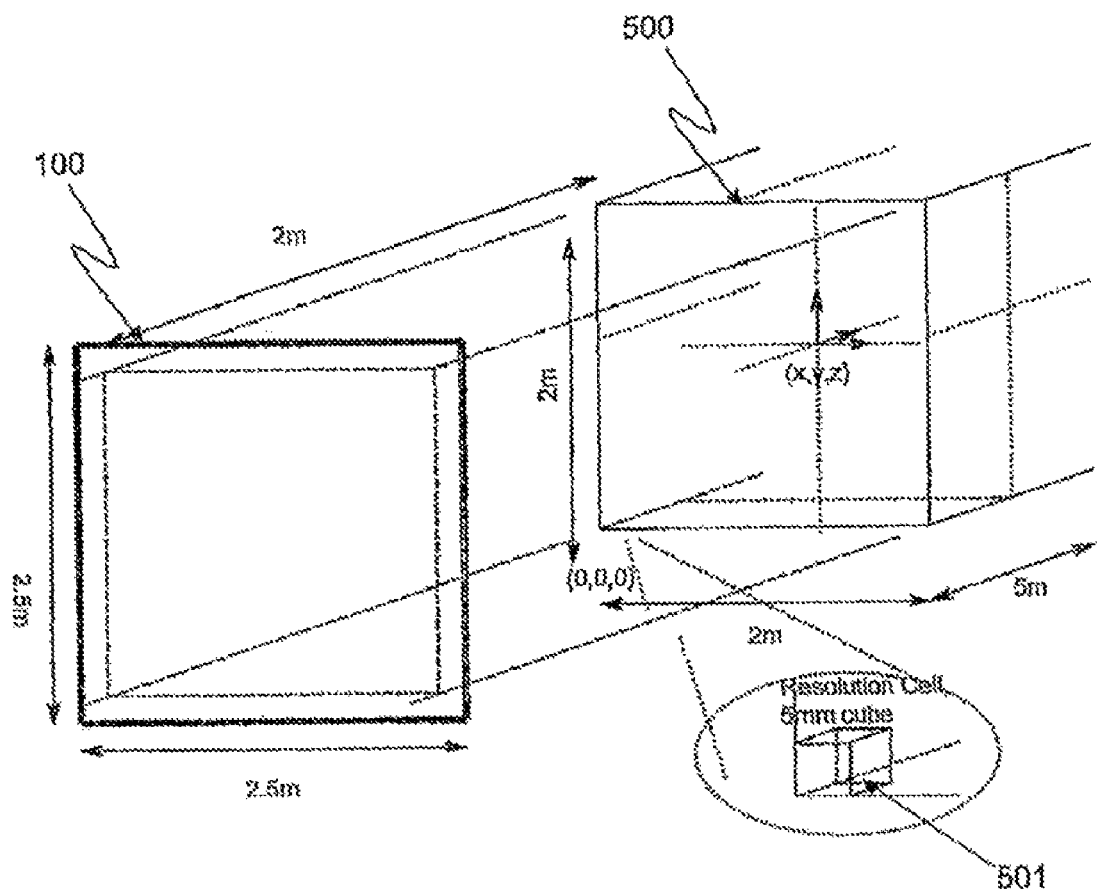
FIG. 5 is a schematic diagram depicting the analysis geometry for an imaging system according to one embodiment of the present invention.

With reference to FIG. 5 there is shown a schematic of the analysis geometry for the array 100 of FIG. 1. In this particular example a snapshot of the analysis volume 500 is shown at a distance of 2 meters from the array 100 at this range the coverage area is 2 m×2 m with a depth of focus of 0.5 m. For processing purposes the volume to be imaged is divided into a plurality of resolution cells 501, which in this instance are 5 mm cubes. Focusing on each cell firstly requires the conversion of the distance between each transmitter element, and each receiver element to a delay time and then removing the delay time from the received signals, before summing the signals from all the transmitter and receiver element pairs. This is then repeated for each cell in the scene at incremental angles and distances over the volume to be imaged. This produces a 3D image of the scene, from which it is possible to extract 2D image data for display.

Figure 6A:
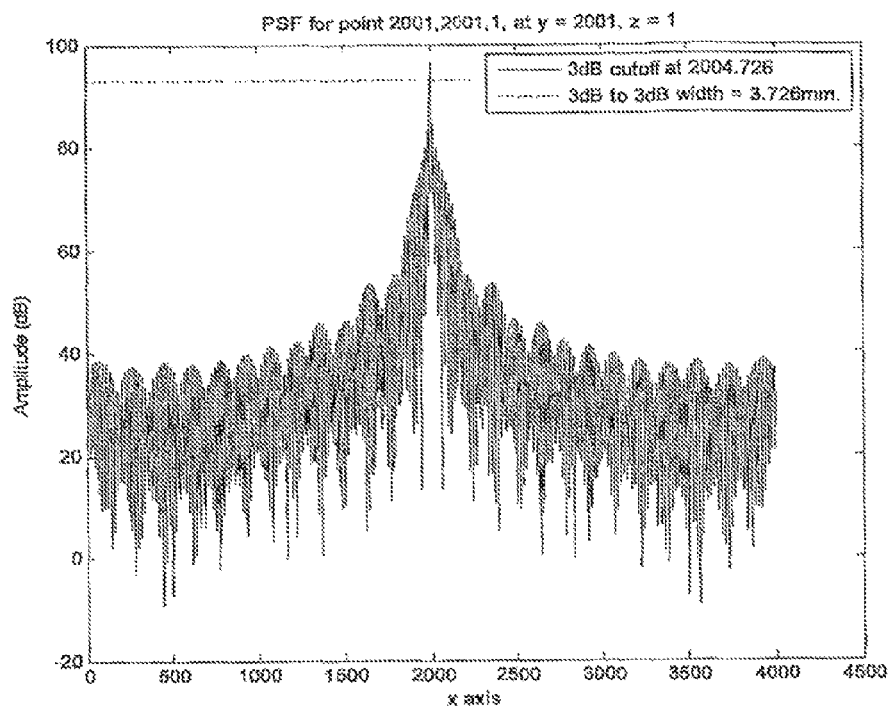
FIGS. 6A to 6F are plots of the point spread function for one possible configuration of a radar array for use in the imaging system according to one embodiment of the present invention.
Figure 6B:
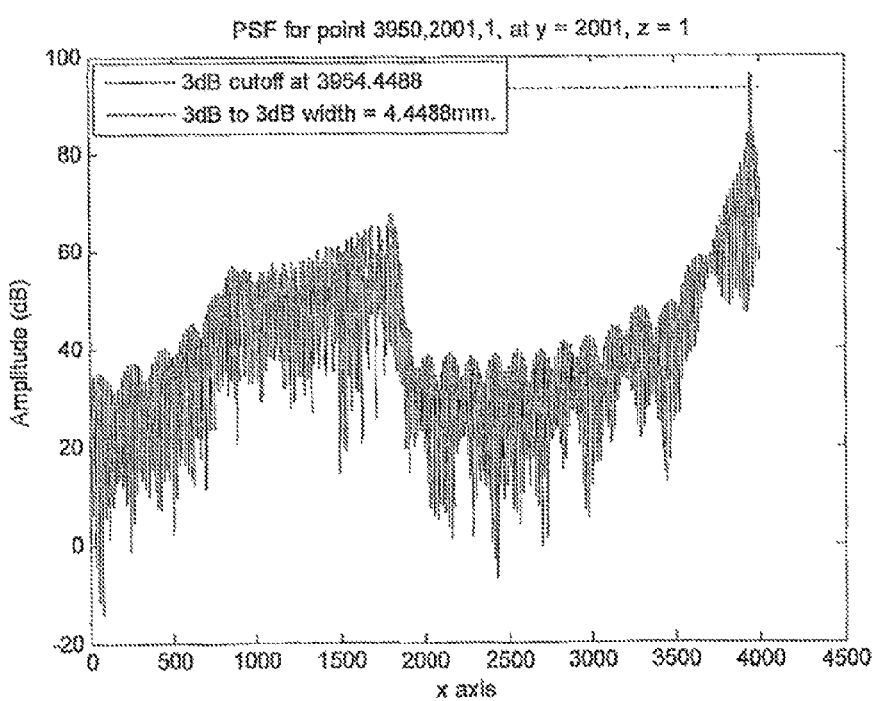
Figure 6C:
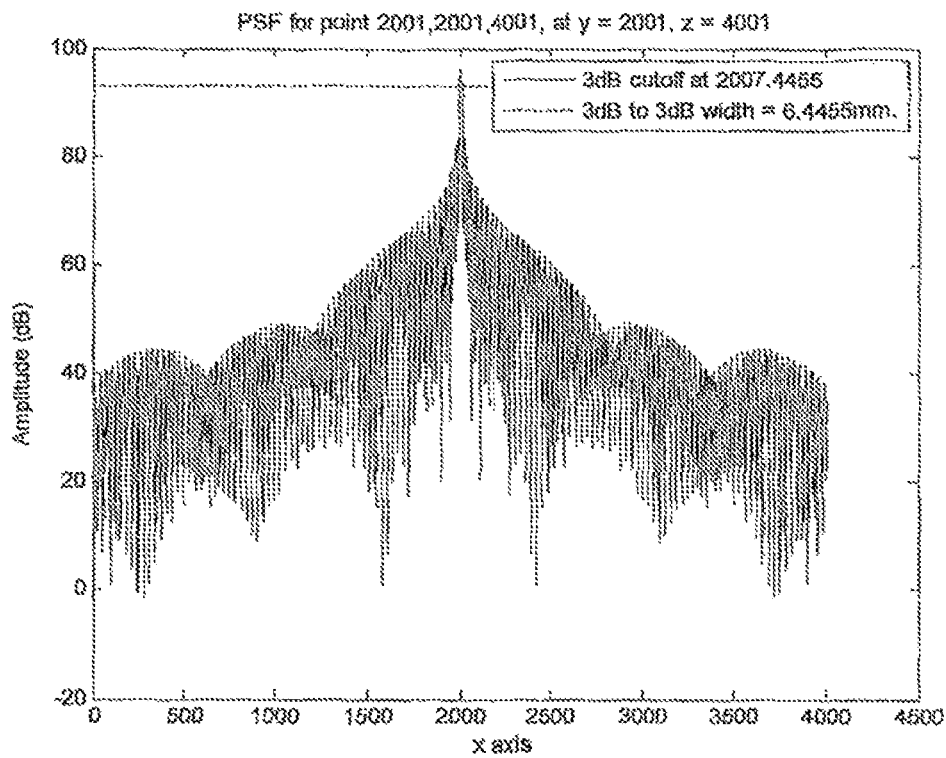
Figure 6D:
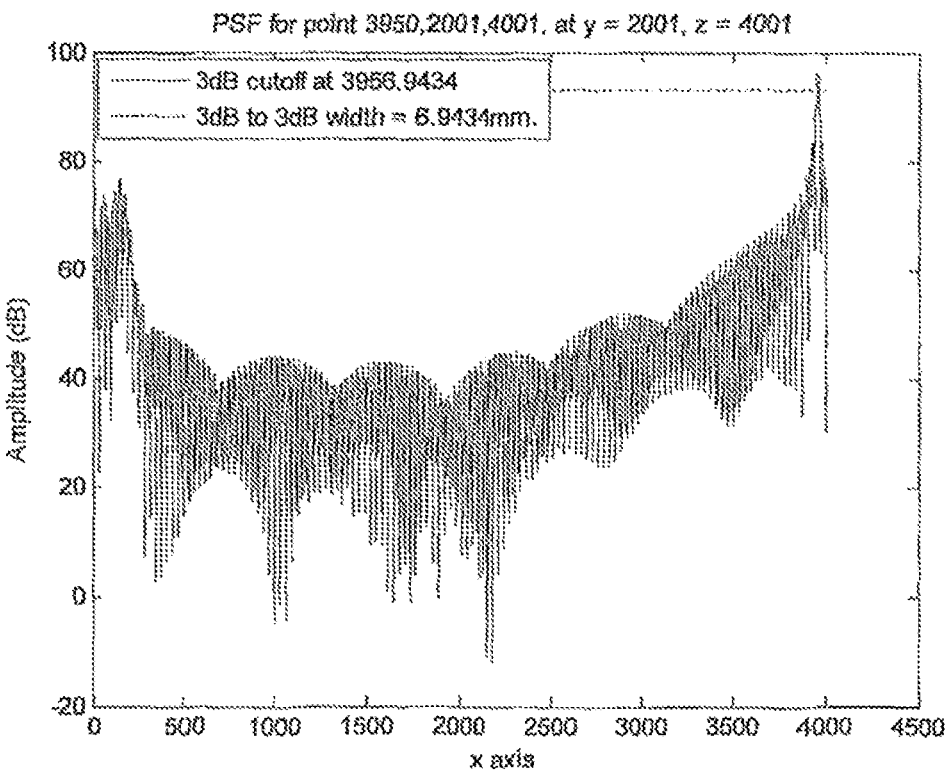
Figure 6E:
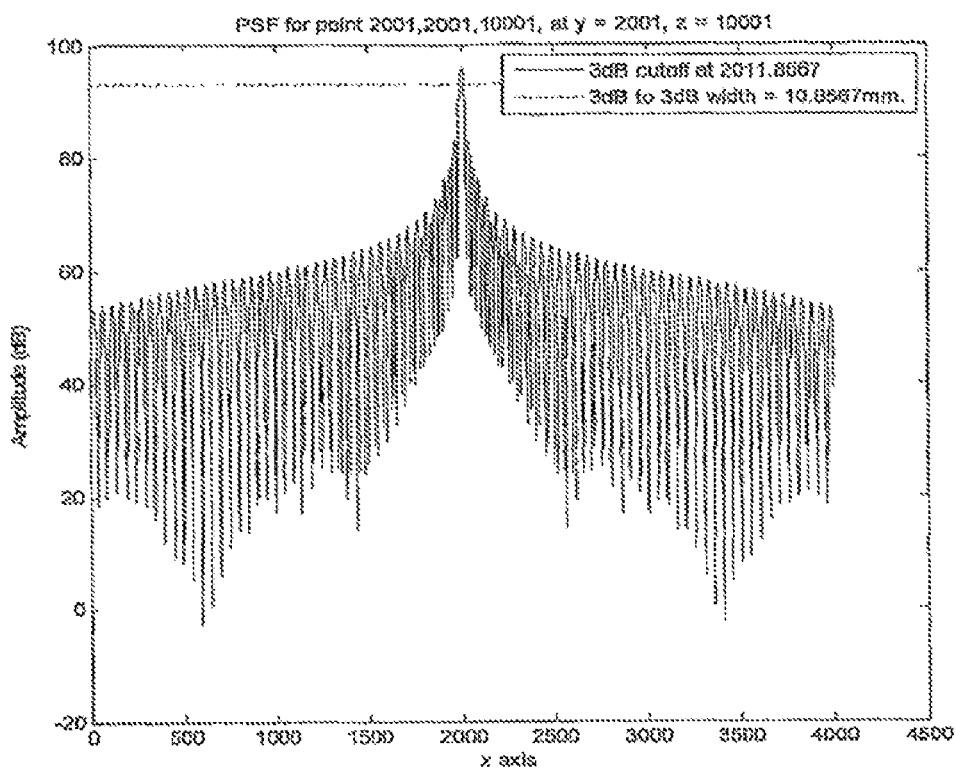
Figure 6F:
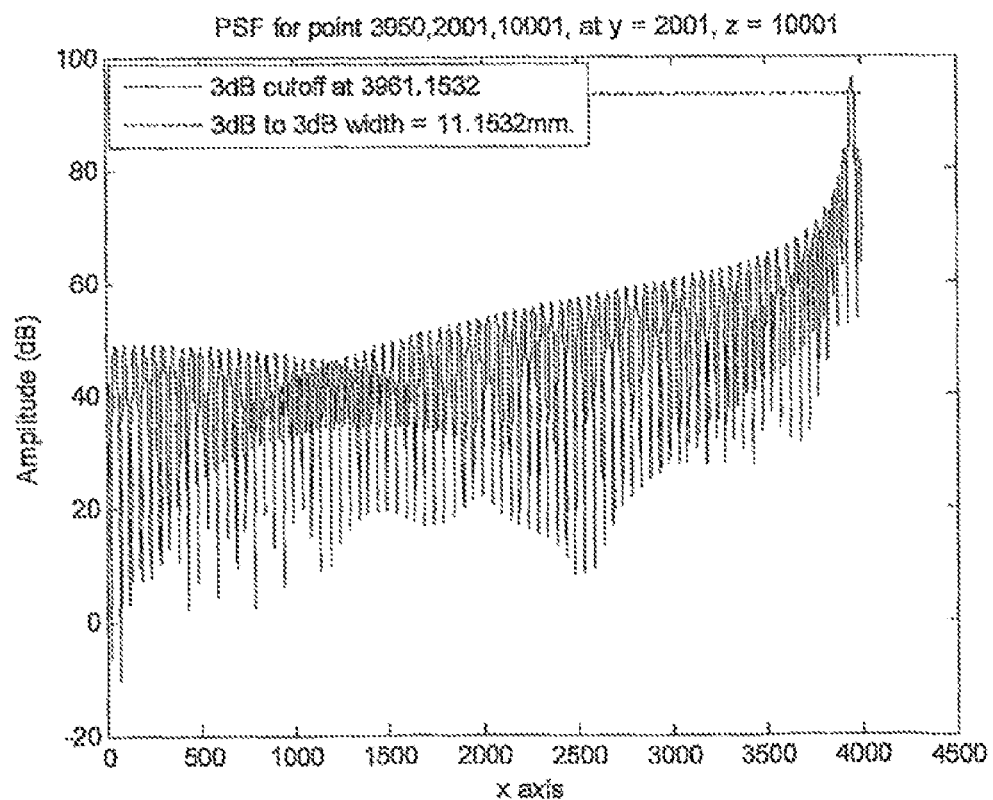

FIGS. 6A to 6F are plots of the point spread function for a 2.5×2.5 metre array of the construction discussed above. FIGS. 6A and 6B show the resolving power for the array at a distance of 2 metres at an operating frequency of 35 GHz. FIG. 6A shows the computed point spread function on axis at a range of 2 m with a beamwidth of 3.7 mm, while 6B shows the computed point spread function at a range of 2 m and off axis by 1 m with a beamwidth of 4 mm. FIGS. 6C and 6D show the resolving power at 4 metres for the array at an operating frequency of 35 GHz. FIG. 6C shows the computed point spread function on axis at a range of 4 m with a beamwidth of 6.4 mm, while 6D shows the computed point spread function at a range of 4 m and off axis by 1 m with a beamwidth of 6.9 mm. FIGS. 6E and 6F show the resolving power at 7 metres for the array. FIG. 8E shows the computed point spread function at a range of 7 m on axis with a beamwidth of 10.9 mm, while FIG. 6F shows the point spread function at a range of 7 m and off axis by 1 m with a beam width of 11.2 mm. In all of the above plots the horizontal x axis scale factor corresponds to 5 mm increments, with 2000 representing the point normal to the centre of the array, and 0 and 4000 representing point one metre off centre. Through symmetry the plots represent both the vertical and horizontal pattern.

A plot of the cross-range resolution verses the range base on the following table:

| Range | 3 dB-3 dB (beamwidth) |
| --- | --- |
| 2 m | 3.7 mm |
| 3 m | 5.1 mm |
| 4 m | 6.4 mm |
| 5 m | 7.9 mm |
| 6 m | 9.4 mm |
| 7 m | 10.9 mm |

Figure 7:
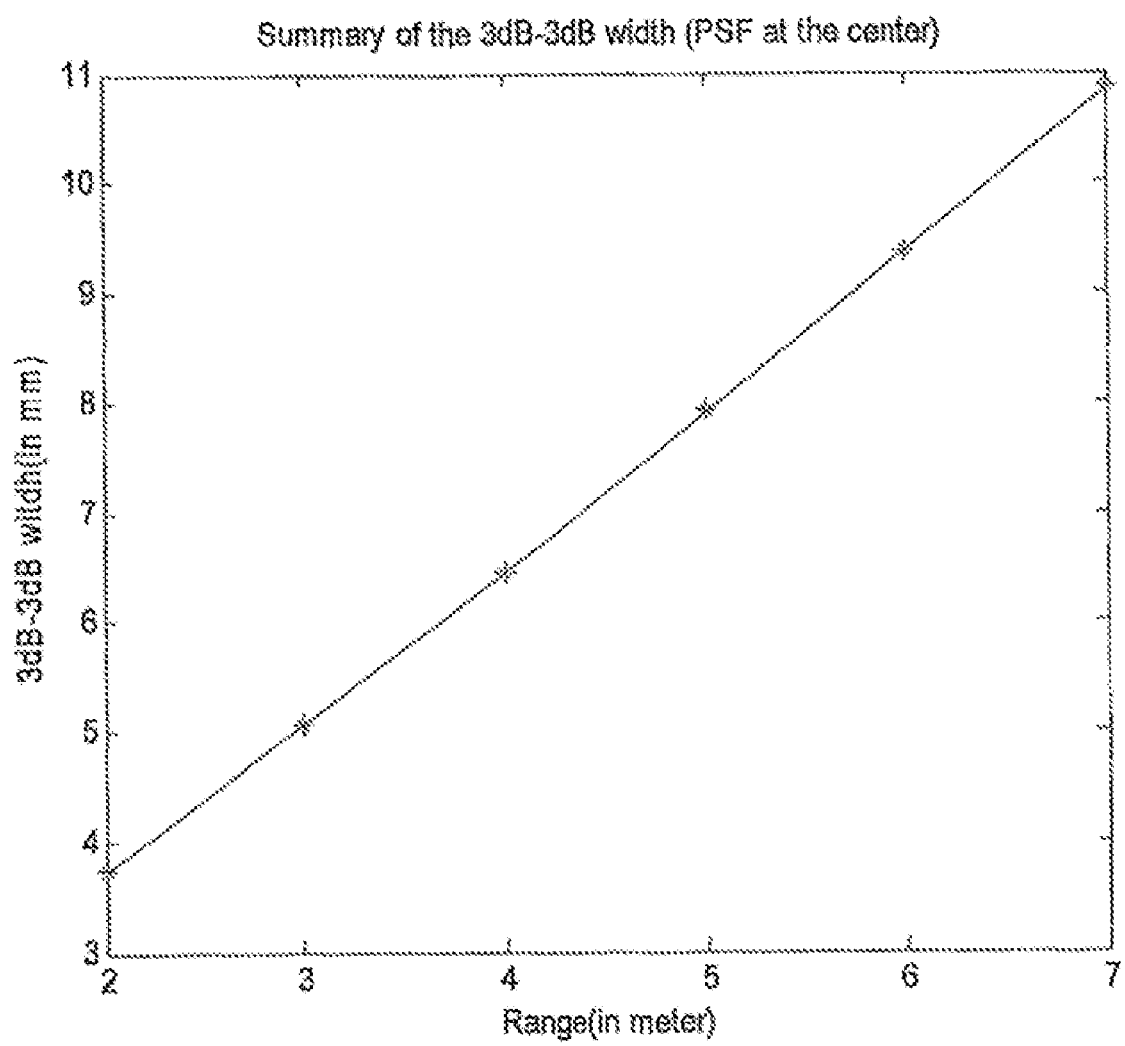
FIG. 7 is plot of the resolution verses range for an imaging system according to one embodiment of the present invention.

As can be seen from FIG. 7 and the above table the point spread function is proportional to the range, suggesting a useful capability offering a resolving power of 3.3 cm at 21 m.

While the above discussion has focused on an imaging system utilising a square array having 128 elements per side, the applicant has also experimented with square arrays including 64 elements per side and 256 elements per side.

The 64×64 element version of the array is of a similar construction to that of the 128×128 element of FIG. 1. One of the principle advantages of the 64 element version is that cost of construction is significantly less than that of the 128 element version, however decreasing the number of elements causes the sidelobes to be positioned high and close into the array. As such a system utilising a 64×64 array requires the application of additional processing to take into account the effects of the sidelobes.

Figure 8A:
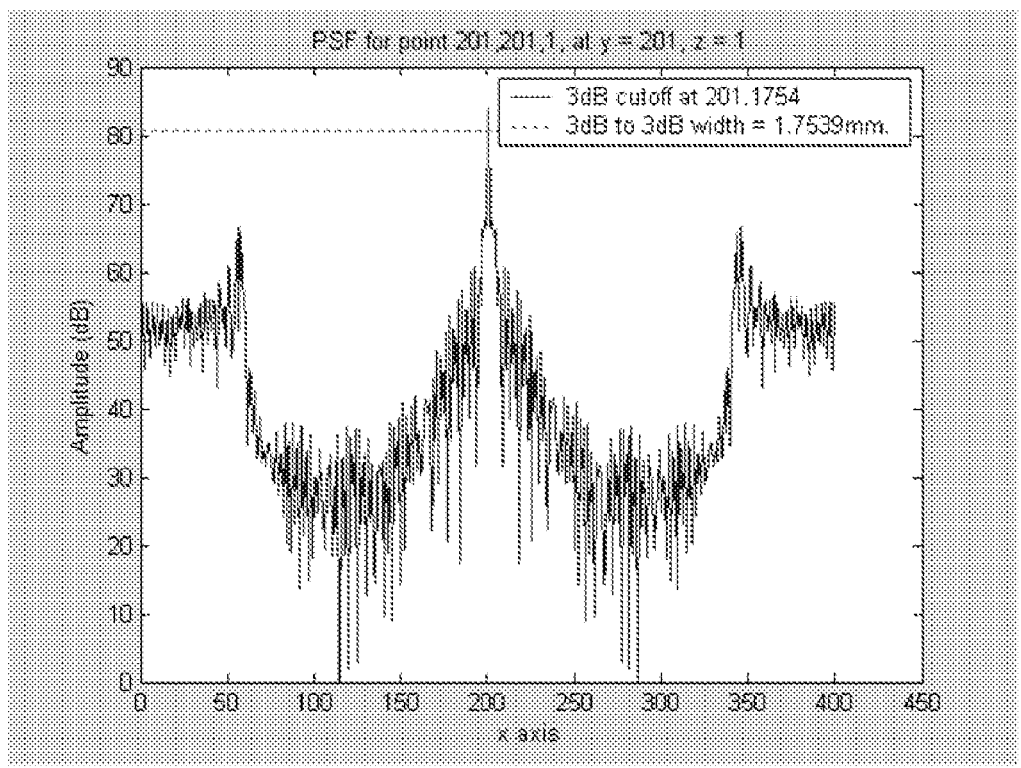
FIGS. 8A to 8F are plots of the point spread function for one possible configuration of a radar array for use in the imaging system according to one embodiment of the present invention.
Figure 8B:
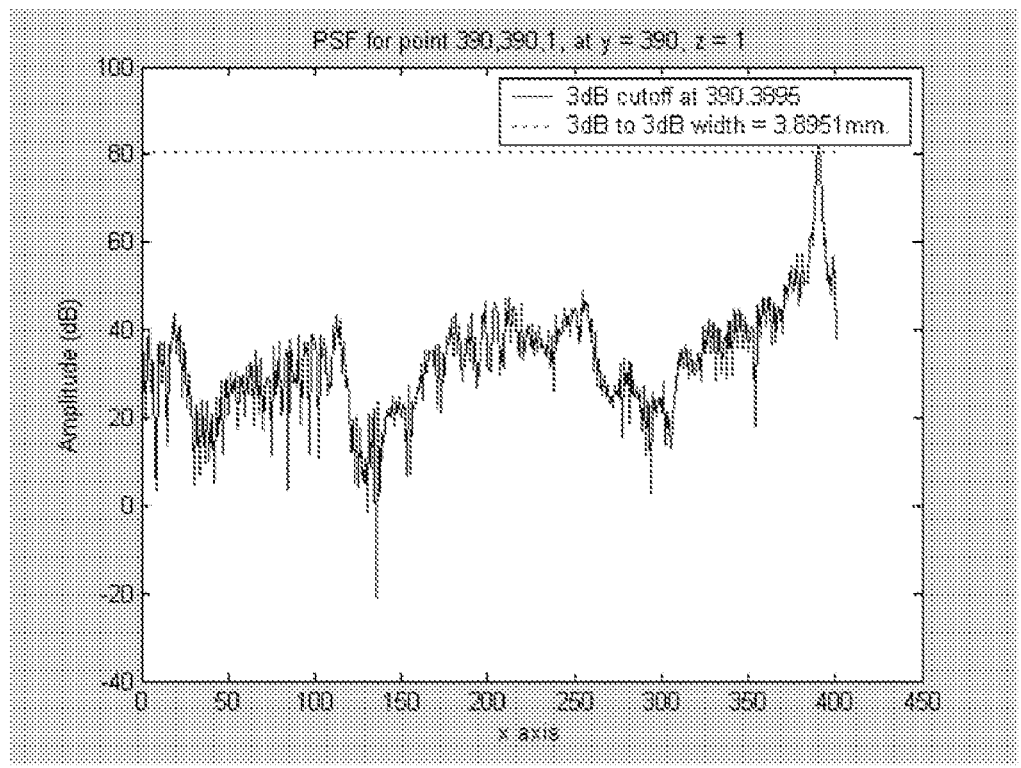
Figure 8C:
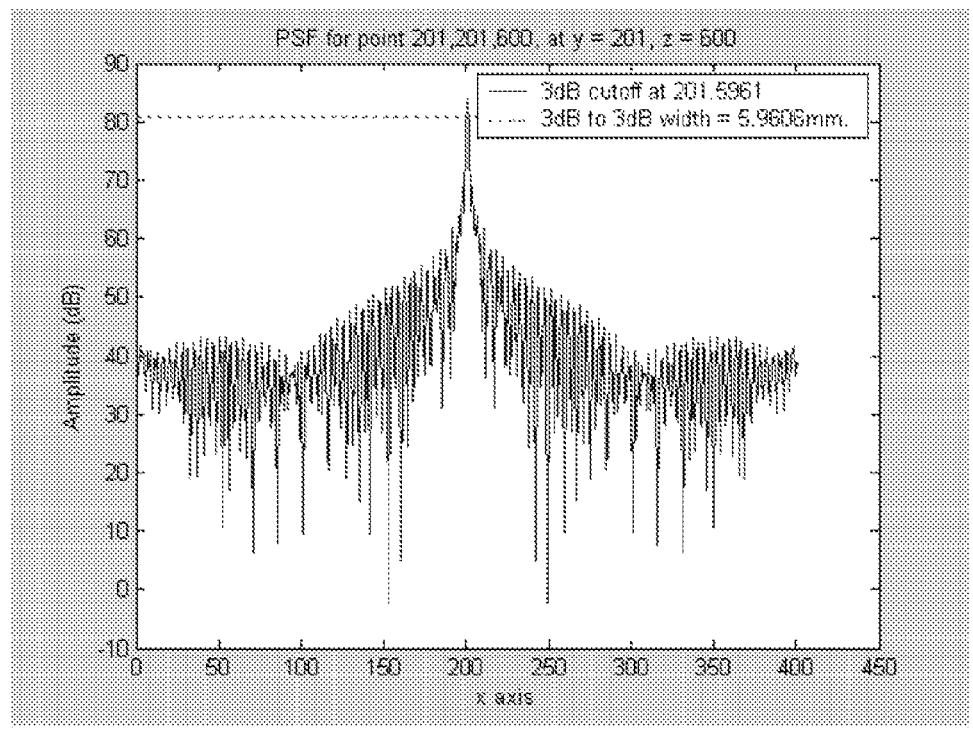
Figure 8D:
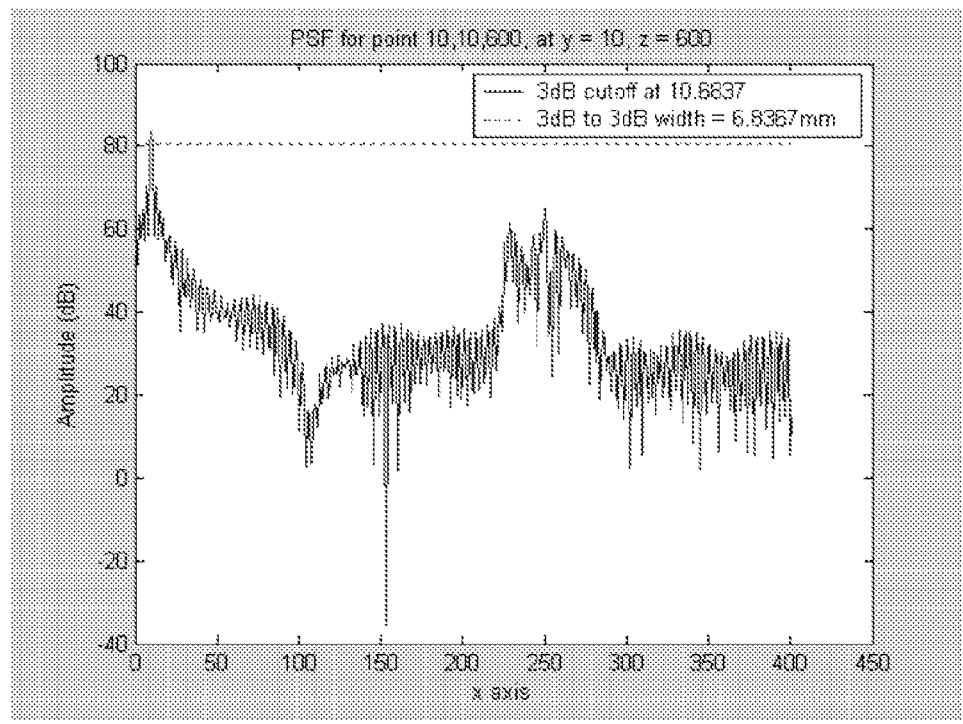
Figure 8E:
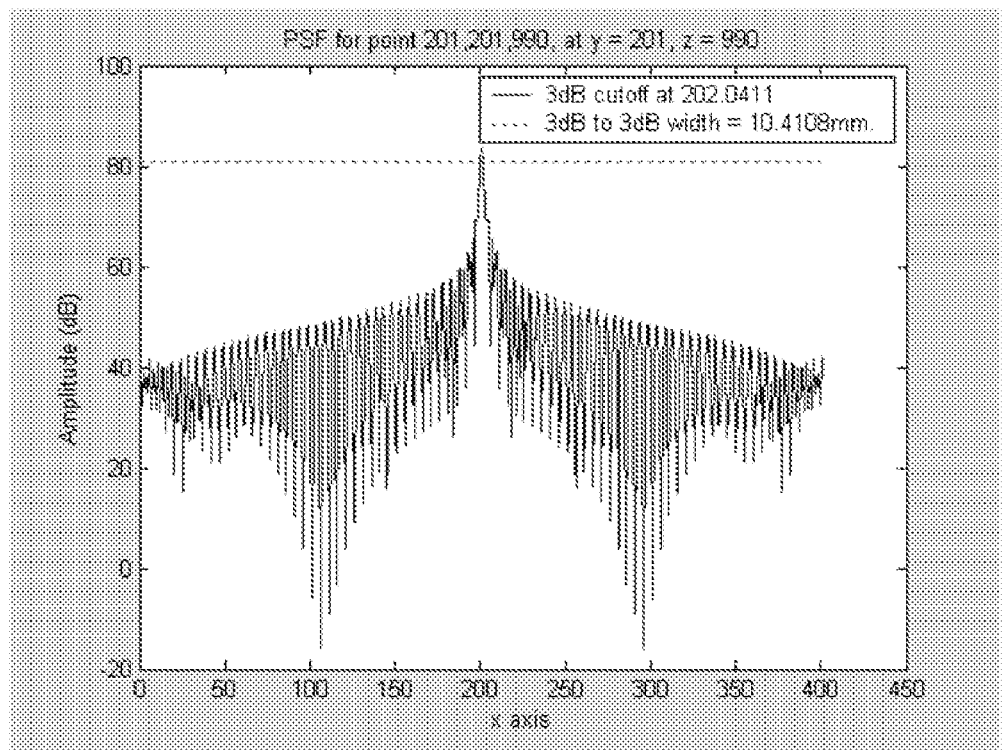
Figure 8F:
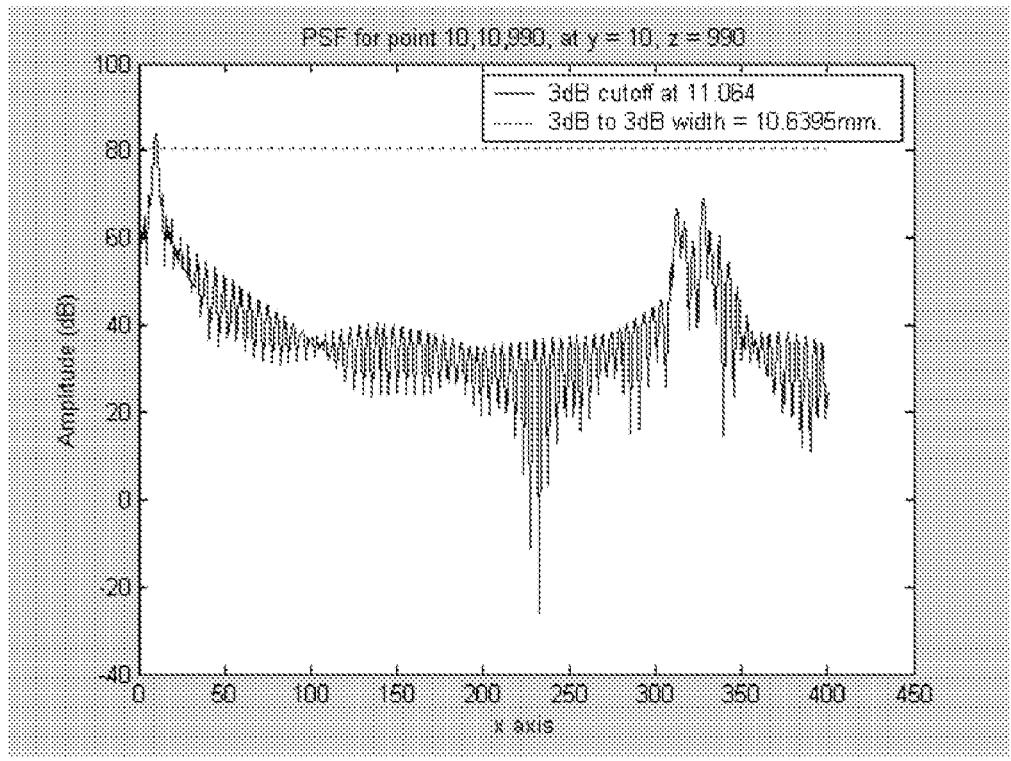

Examples of the point spread function for a 2.5×2.5 metre 64 element square array are shown in FIGS. 8A to 8F. FIGS. 8A and 8B show the resolving power at 2 metres for the array. FIG. 8A shows the computed point spread function on axis at a range of 2 m with a beamwidth of 1.8 mm, while 8B shows the computed point spread function at a range of 2 m and off axis by 1 m with a beamwidth of 4 mm. FIGS. 8C and 8D show the resolving power at 5 metres for the array. FIG. 8C shows the computed point spread function on axis at a range of 5 m with a beamwidth of 6 mm, while 8D shows the computed point spread function at a range of 5 m and off axis by 1 m with a beamwidth of 7 mm. FIGS. 8E and 8F show the resolving power at 7 metres for the array. FIG. 8E shows the computed point spread function at a range of 7 m on axis with a beamwidth of 10.4 mm, while FIG. 8F shows the point spread function at a range of 7 m and off axis by 1 m with a beam width of 10.6 mm as can be seen from these figure the point spread function is now proportional to the range (i.e. 20.8 mm wide beamwidth at a range of 14 m etc).

Figure 9A:
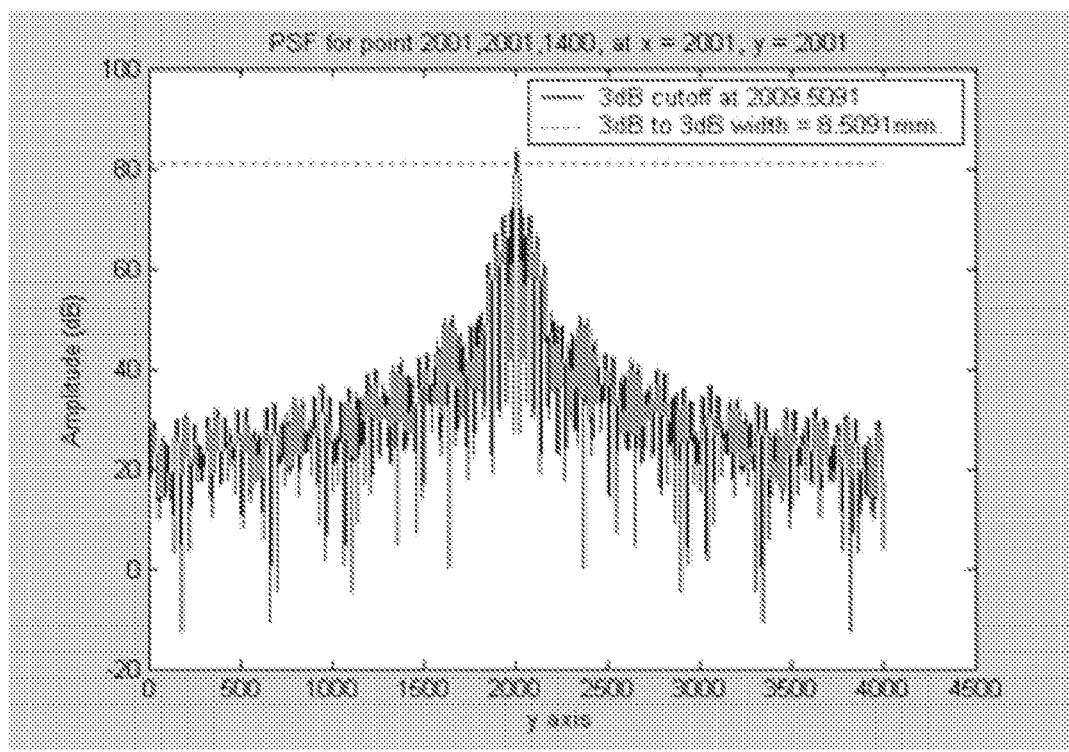
FIGS. 9A to 9F are plots of the point spread function for one possible configuration of a radar array for use in the imaging system according to one embodiment of the present invention.
Figure 9B:
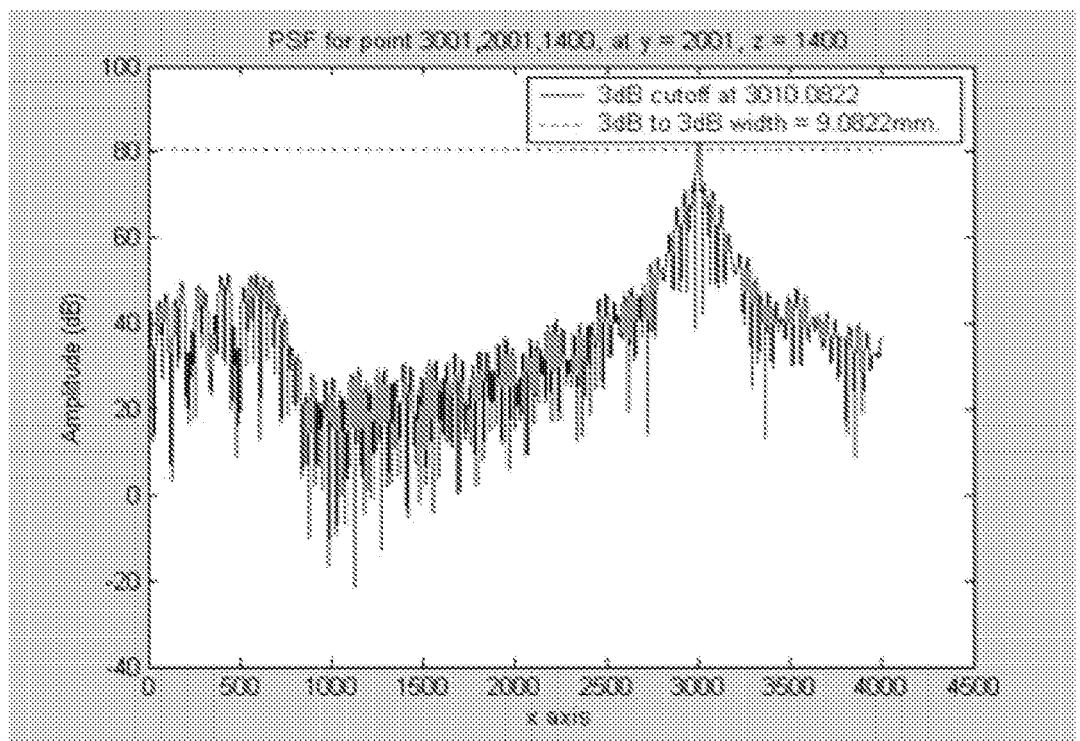
Figure 9C:
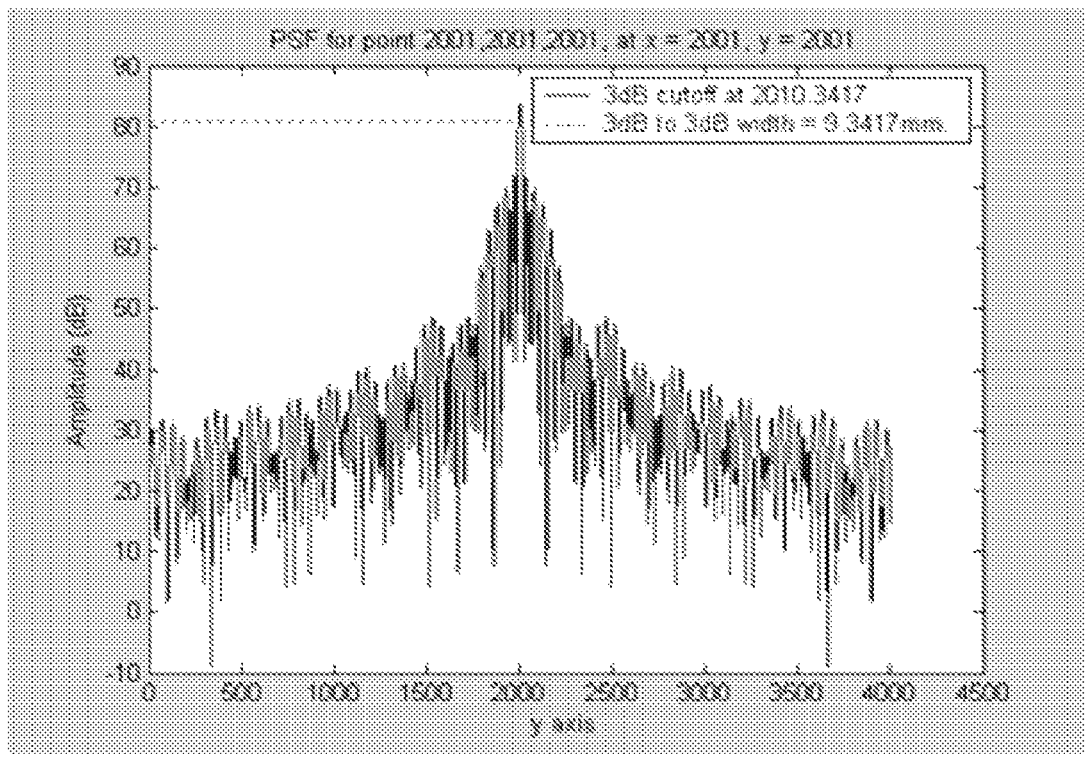
Figure 9D:
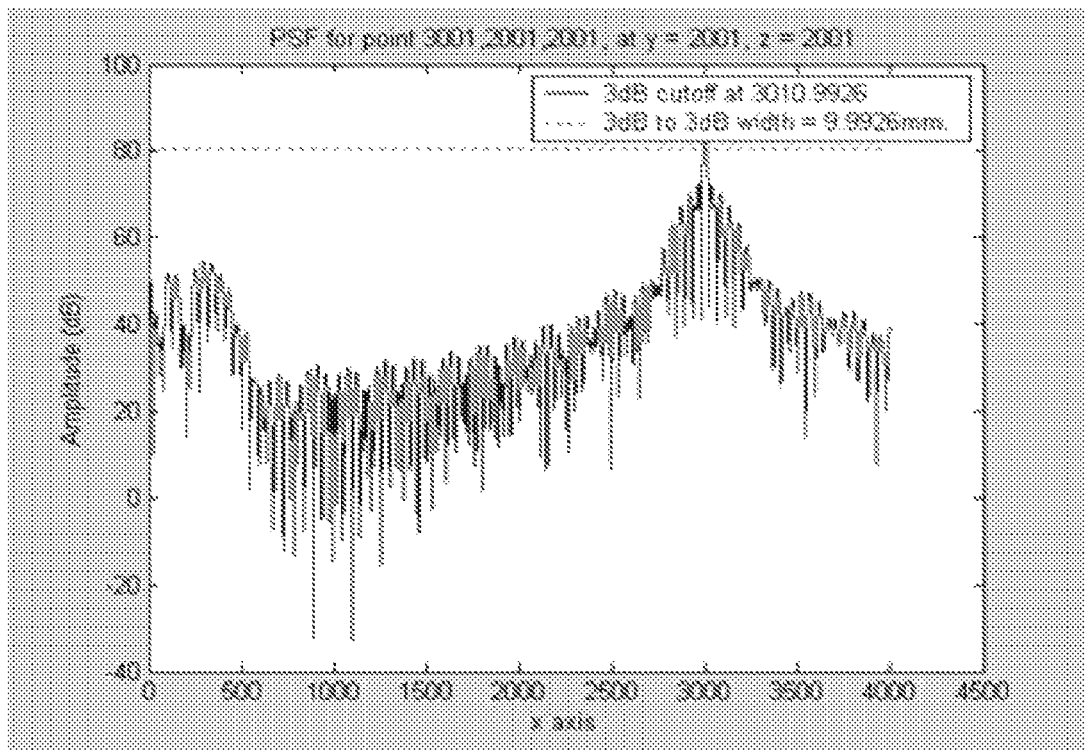
Figure 9E:
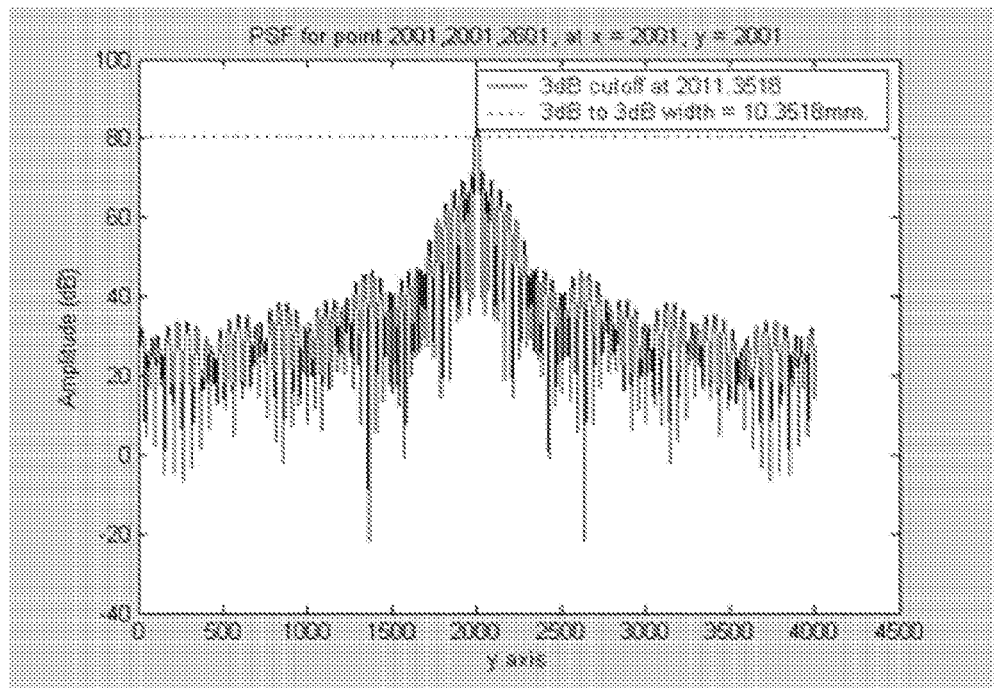
Figure 9F:
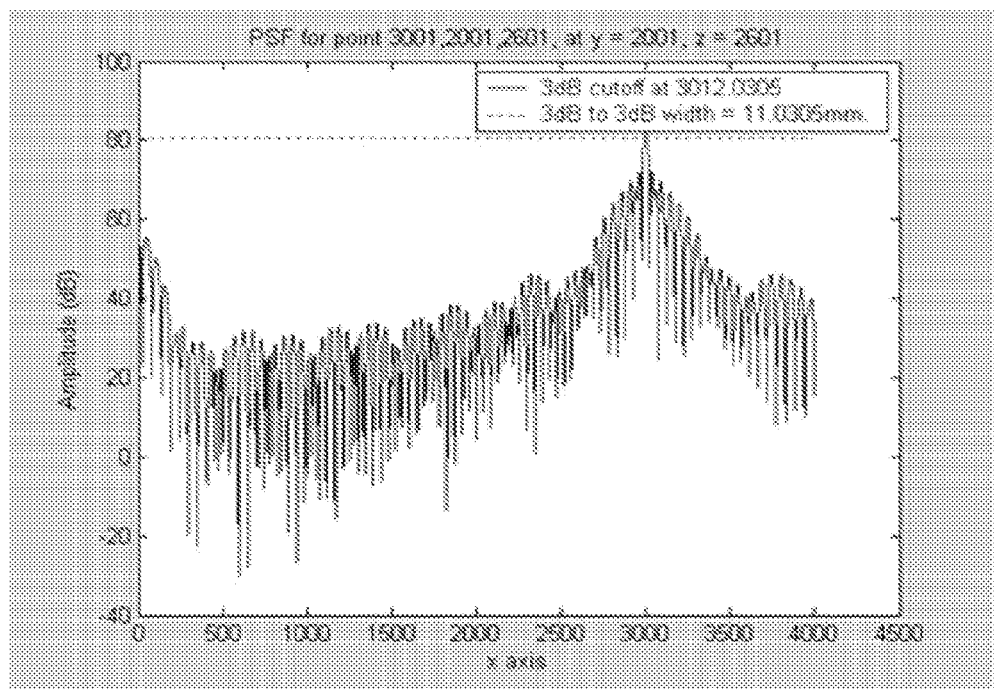

FIGS. 9A to 9F show plots of the point spread function for a 2.5×2.5 metre 64 element square array transmitting in the X-band. FIG. 9A shows the point spread function at a range of 0.7 m along the y axis. As can be seen the resultant beamwidth is in the order of 8.5 mm. FIG. 9B shows the point spread function at a range of 0.7 m along the x axis with a beamwidth of approximately 9 mm. FIG. 9C shows the point spread function at a range of 1 m along the y axis. As shown the beamwidth at this range is in the order of 9.3 mm. FIG. 9B shows the point spread function at a range of 1 m along the x axis with a beamwidth of approximately 10 mm. FIG. 9E shows the point spread function at a range of 1.3 m along the y axis with a beamwidth of approximately 10.3 mm Finally FIG. 9F shows the point spread function at a range of 1.3 m along the x axis with a beamwidth of approximately 11 mm.

Figure 10:
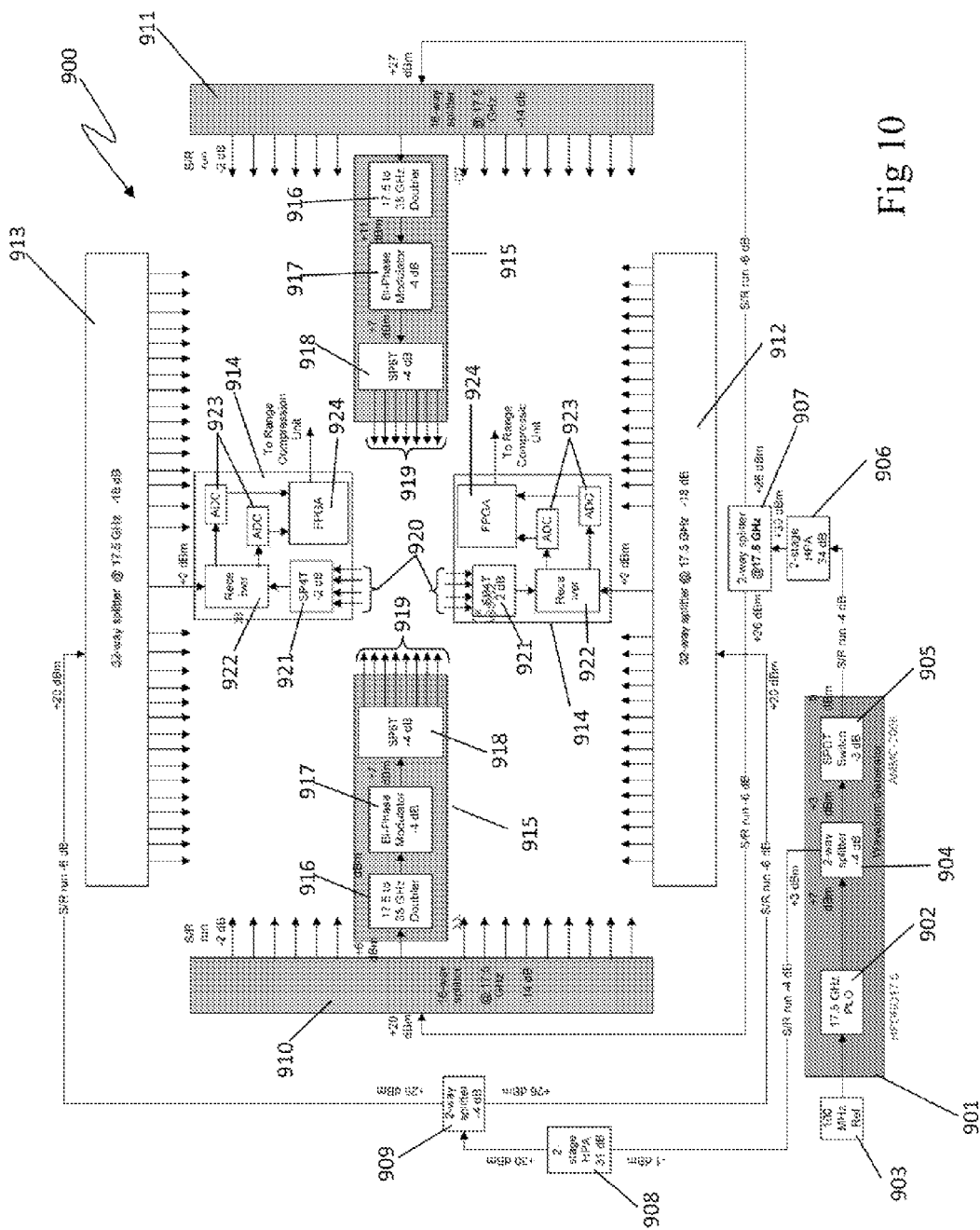
FIG. 10 is a schematic diagram of one possible configuration of a radar array for use in the imaging system of one embodiment of the present invention.

FIG. 10 is a schematic block diagram of one possible arrangement for a 256×256 element square array 900. In this case the master waveform generator 901 includes a 17.5 GHz phase locked oscillator 902 which is coupled to a 100 MHz reference oscillator 903. The signal from the 17.5 GHz phase locked oscillator 902 is passed to a 2 way splitter 904, one arm of the splitter being coupled to a 2 stage High Power Amplifier (HPA) 908 while the remaining arm is coupled to switch 905, which in this case acts as the pulse shaper (i.e. switch is opened and closed at a timing corresponding to the burst length of the transmission pulse). The output from switch 905 is then passed to a 2 stage High Power Amplifier (HPA) 906, the amplified signal is then passed to 2 way splitter 907 the arms of which are coupled to 32 way splitters 910 and 911 respectively in order to provide the carrier pulses to the transmission sub-arrays. Splitter 910 divides the transmission signal amongst the 32 transmission modules of the left hand transmission sub-array of the square array 900. Likewise splitter 911 divides the transmission signal amongst the 32 transmission modules of the right hand transmission sub-array.

For clarity only one transmission module 915 form each side of the square array has been illustrated. As shown each transmission module includes a 17.5 to 35 GHZ doubler 916 the resultant transmission carrier signal is then fed to a bi-phase modulator 917 where the chosen coding scheme is combined with the carrier pulses. The coded pulses from the modulator 917 is then applied to a single pole 8 through switch 918 which proceeds to broadcast the pulse in succession across the 8 antenna elements 919 service by the transmission module 915.

The amplified signal from HPA 908 is passed to 2 way splitter 909 the arms of which are, coupled to 32 way splitters 912 and 913 respectively in order to provide the necessary reference signal to each of the homodyne receives 922 within each of the receiver modules. Splitter 912 in this case divides the reference signal amongst the receiver modules of the lower receiver sub-array, while splitter 913 divides the reference signal amongst the receiver modules of the upper receiver sub-array.

For clarity one receiver module 914 form each side of the square array has been illustrated. As shown each receiver module 914 services a set of 8 receiving antenna elements 920 which are coupled to a single pole 8 through switch 921 which channels the received signals into the homodyne receiver 922. The demodulated signals are passed by the homodyne receiver 922 to the modules analogue to digital conversion units 923. The digitised signals form these units are then fed to the modules' 914 field programmable gated array 924 for pre-processing and range compression before being passed to the digital signal processor for analysis (not shown).

If the system were required to image a volume 0.5 m in range by 2 m in elevation and 1 m in width, with range increments of 10 cm and cross range increments of 1 cm utilising the above discussed 256×256 array, it of would required to focus 50×200×5=50,000 points. Each point to be focussed will require the complex numbers from the 256×256=65536 path combinations to be multiplied by the same number of complex numbers representing the path lengths, and these then summed. The 65536 complex multiplies or 262,144 real multiplies, must ideally be completed in a frame interval of 100 ms (for a 10 Hz display frame rate). This leads to a computational rate of 62,144×50,000×10=31,072,000,000 real multiplies per second. Such a processing load is well within the processing capabilities of most specialised processor boards.

The applicant has thus far considered three main applications for the imaging system of the present invention. Firstly an imaging system utilising any one of the array constructions discussed above be used in a number of security applications for instance a long range version could be used in a check point screening application, while two of the arrays could by placed in close proximity for use in a relative short range application such as entry point screening. Another possible application for the invention is in the assist aircraft in landing applications, for example aircraft such as helicopters landing in the desert, where the dust raised by the rotor can obscure the landing spot and cause accidents. Here a downward-looking form of the invention would image the ground through the dust cloud. In addition to this the applicant also envisages that a portable or hand held version would find application in a number of search and rescue applications.

Figure 11:
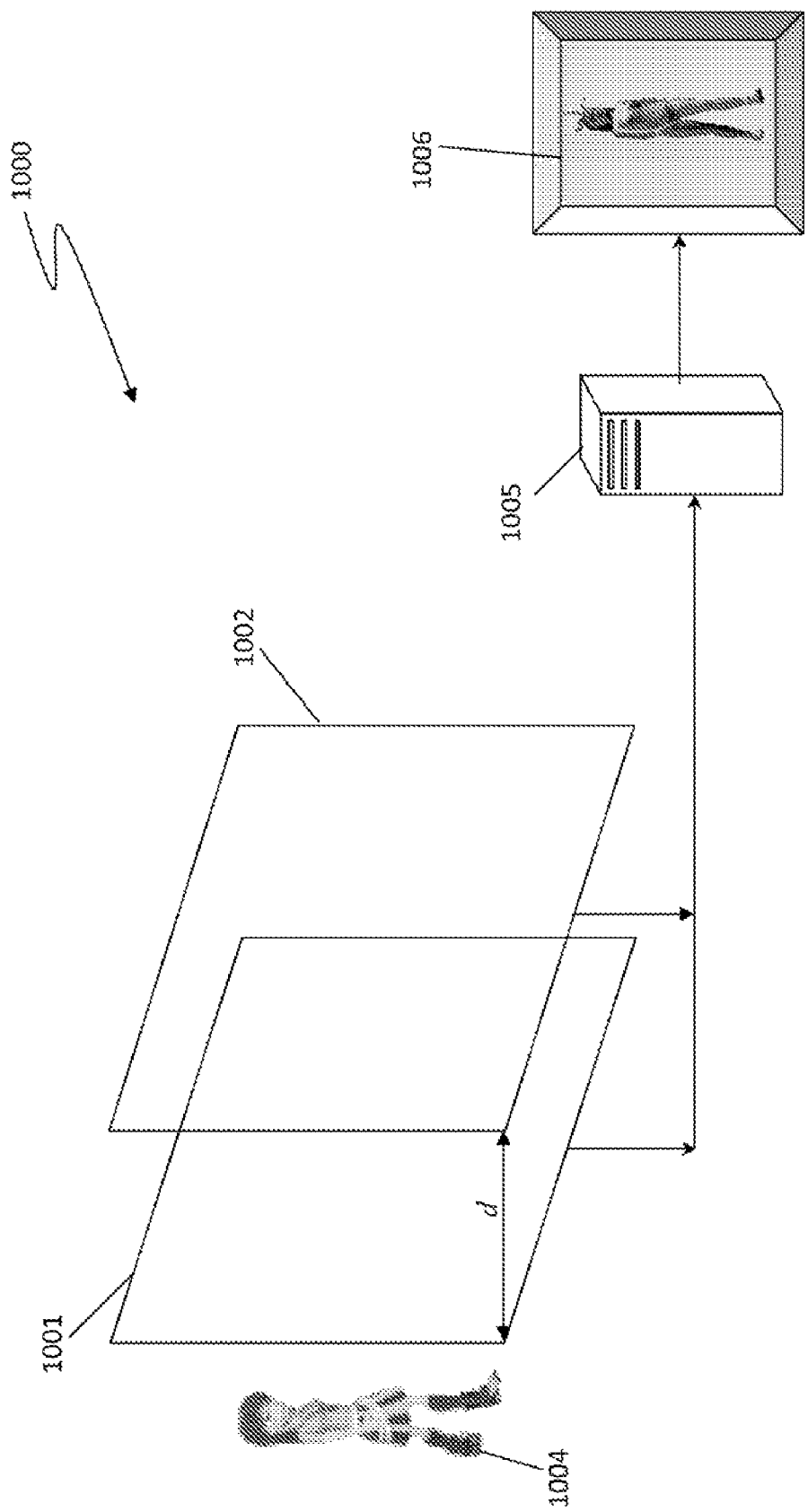
FIG. 11 is a schematic diagram of one possible configuration of an imaging system according to one embodiment of the present invention.

An example of a walkthrough whole body scanning system 1000 is shown in FIG. 11. The system 1000 includes two arrays 1001, 1002 (of similar construction to the array of FIG. 1 discussed above) arranged back to back configuration spaced apart by distance d. Each of the arrays 1001, 1002 transmit a series of coded pluses in the manner discussed above toward an approaching subject 1004. As the subject 1004 approaches first array 1001 begins to capture an image of the front of the subject 1004. As the subject passes through the first array 1001 the second array 1002 begins to capture an image of the front of the subject 1004, while the first array 1001 begins to capture an image of the rear of the subject 1004. Once the subject passes through the second array 1002 the second array begins to capture an image of the rear of the subject 1004. In each case the arrays 1001 and 1002 the transmit pulses of a wavelength that penetrate through the articles of clothing worn by the subject and the resultant front images captured are not only that of the visible portions of the subject body but also include the portions of the subjects body obscured by their clothing.

The raw image data captured by both arrays is then processed in accordance with the MIMO processing technique discussed above. Namely the delay time for the round distance for each received signal is removed in order to align the signals at the pixel point being imaged. This is repeated for each point in the scene at incremental angles and distances over the volume to be imaged. The signals are then summed, each sum represents the image intensity at that point. This data is then complied to form a complete image 1006 of the subject's body including the portions hidden beneath the articles of clothing which they are wearing. Any hidden items such as knives, guns etc are readily identifiable as they have a different radar cross section to that of the human skin. In applications where the raw image would be considered an invasion of privacy it would be possible to apply pattern recognition algorithms to the images and to display any selected objects positioned on a mannequin or wire frame model only.

It will be appreciated by those of ordinary skill in the art that a complete image of the subject could be captured with single array. For example an approaching person could be channeled though a chicane or other type of barrier guide which would by require them to turn around in full view of the array thereby allowing the array to capture an image of the front and back of the subject.

Figure 12:
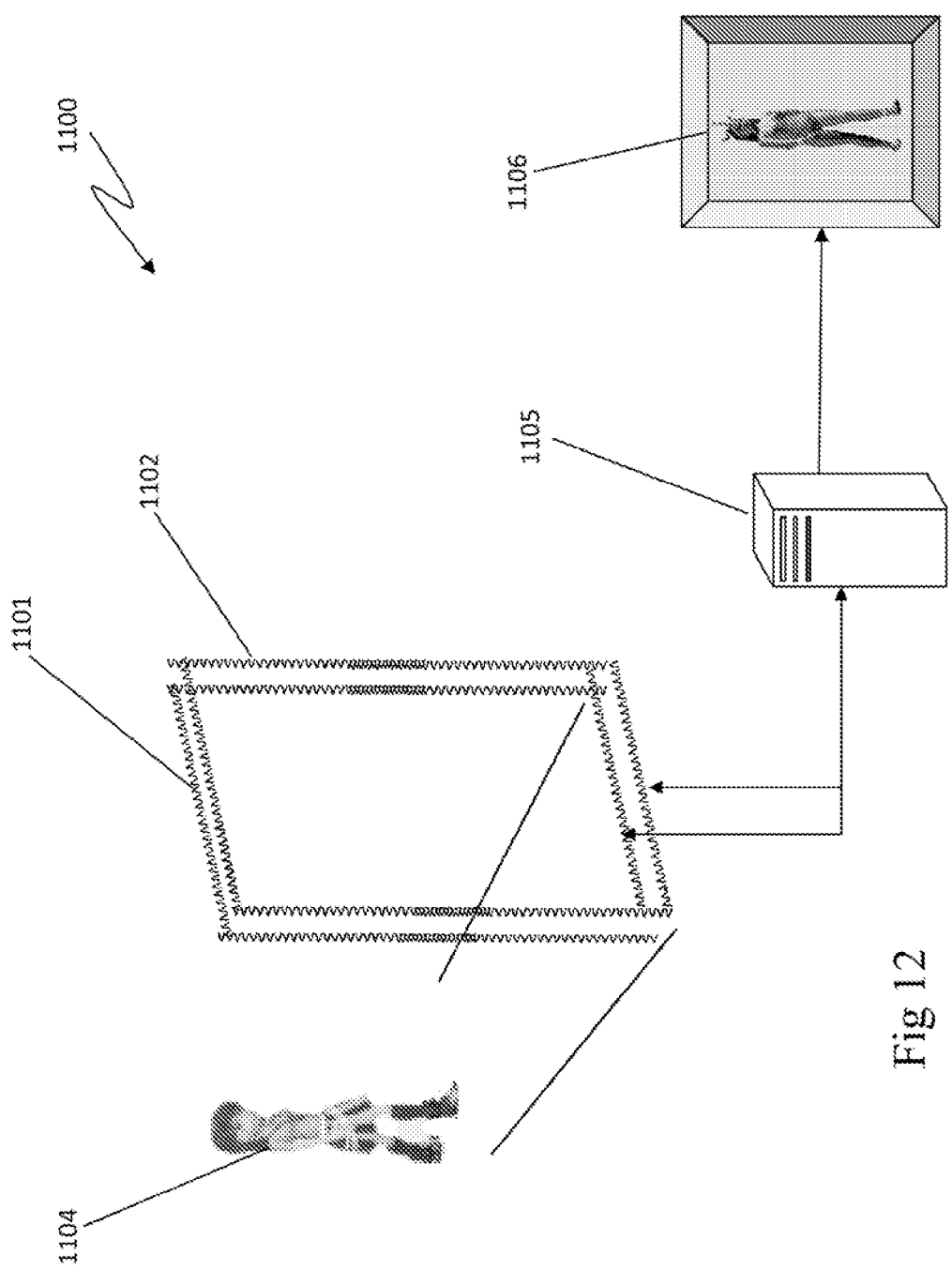
FIG. 12 is a schematic diagram of one possible configuration of an imaging system according to one embodiment of the present invention.

Another example of a walkthrough imaging system 1100 is shown in FIG. 12, this particular system is a stand-off system. Again two arrays 1101, 1102 are utilised, however in this instance the arrays are 2.5 m×1.25 m and have 127 transmitter elements disposed along each vertical edge and 63 receiver elements disposed along each horizontal edge. The operation of the system is identical to that of the imaging system of FIG. 10. That is as the subject approaches the system the arrays transmit a series of coded pluses in the manner discussed above toward the subject 1104. The first array 1101 begins to capture an image of the front of the subject 1104. As the subject passes through the first array 1101 the second array 1102 begins to capture an image of the front of the subject 1104, while the first array 1101 begins to capture an image of the rear of the subject 1104. Once the subject passes through the second array 1102 the second array begins to capture an image of the rear of the subject 1104. In each case the arrays 1101 and 1102 the transmit pulses of a wavelength that penetrate through the articles of clothing worn by the subject and the resultant front images captured are not only that of the visible portions of the subject body but also include the portions of the subject's body obscured by their clothing.

Again the resultant raw signal data captured by the receivers are processed in accordance with the MIMO processing scheme 1105 detailed above in order to form a complete image 1106 of the subject 1104.

Figure 13A:
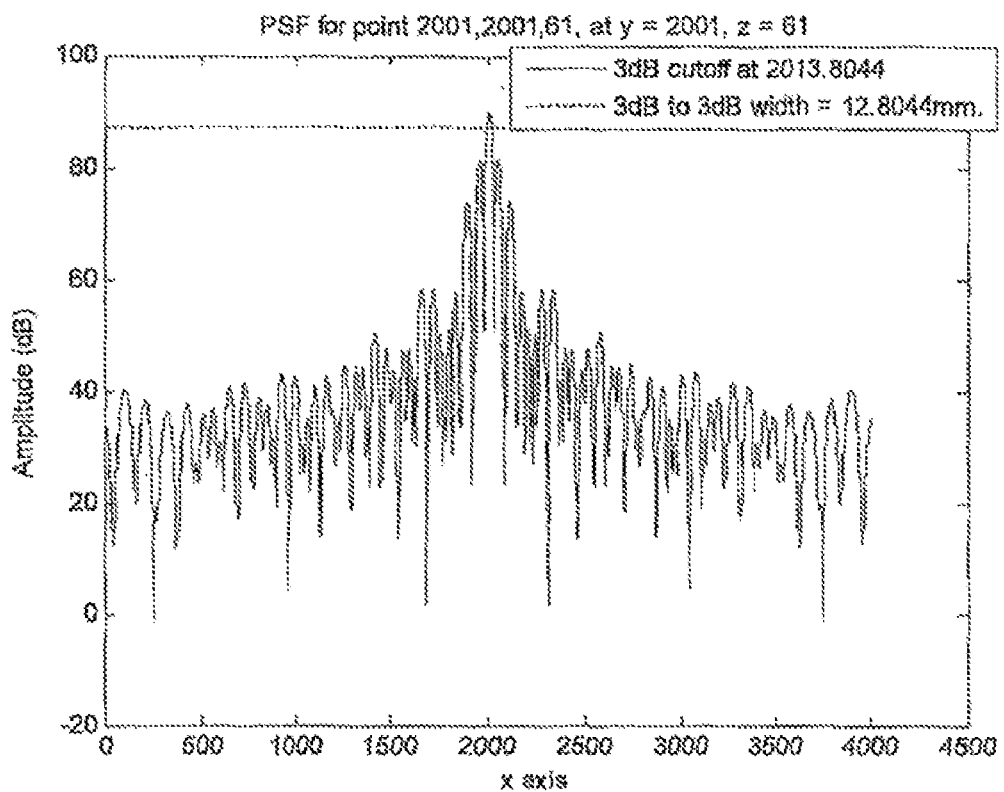
FIGS. 13A to 13D are plots of the point spread function for the array configuration used in the imaging system of FIG. 12.
Figure 13B:
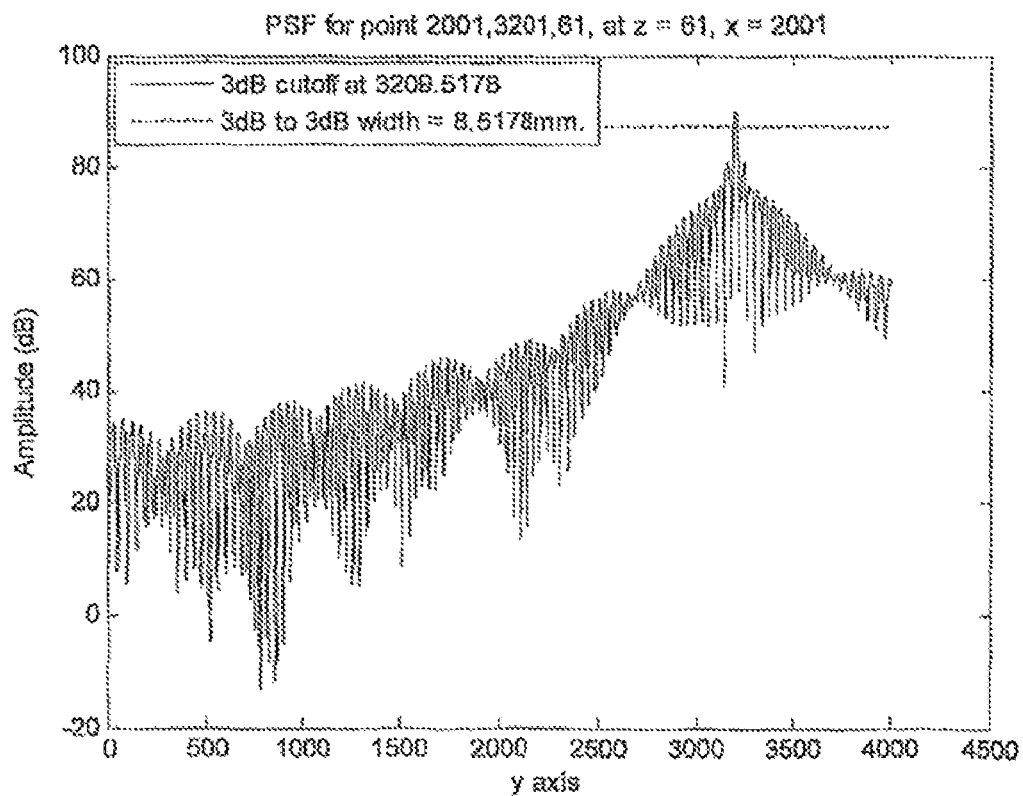
Figure 13C:
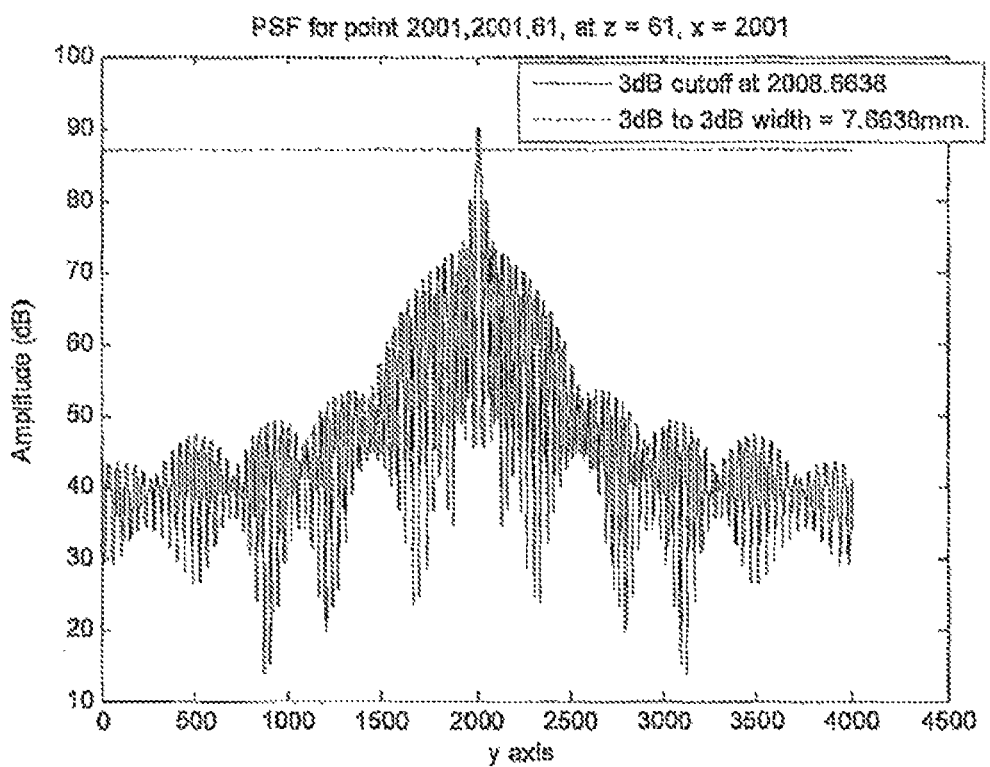
Figure 13D:
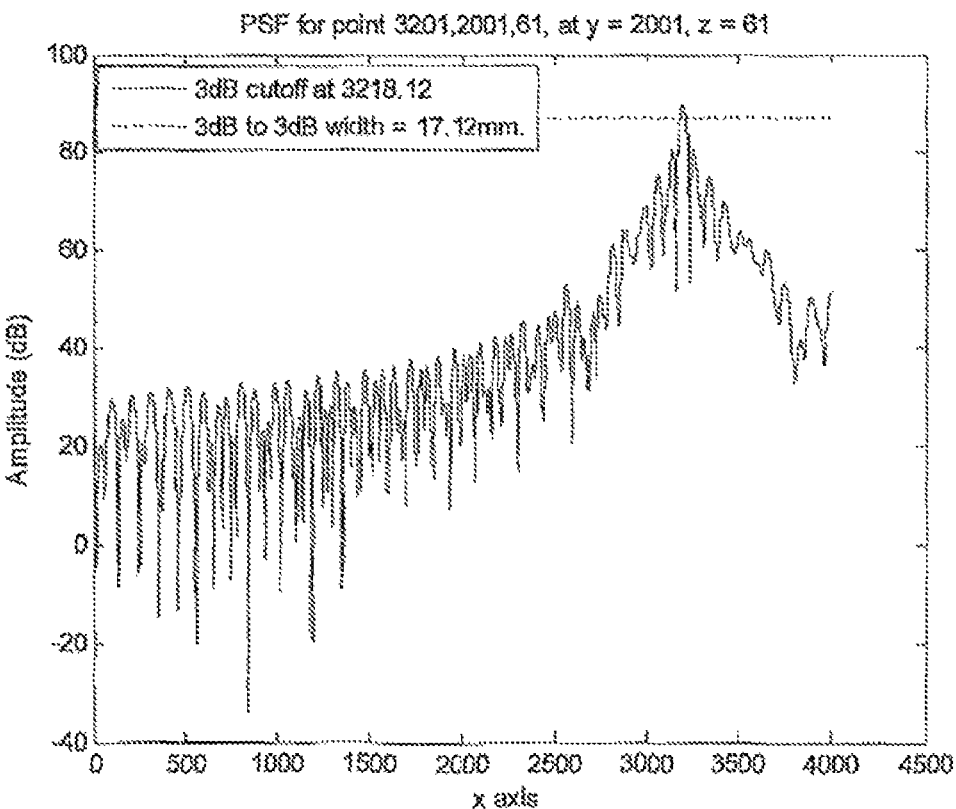

FIGS. 13A to 13D are plots of the point spread function for a 2.5 m×1.25 m array as utilised in the system of FIG. 11 transmitting in the X-band. FIG. 13A shows the point spread function at a range of 0.7 m with a 0.6 offset in elevation and on centre azimuth taken along the x axis. As can be seen the beamwidth in this instance is in the order of 12.8 mm. FIG. 13B shows the point spread function at a range of 0.7 m with a 0.6 offset in elevation and on centre azimuth taken along the y axis. In this case the beamwidth is in the order of 8.5 mm. FIG. 13C shows the point spread function at a range of 0.7 m on centre in elevation and a 0.6 m offset in azimuth taken along the y axis. As show the beamwidth under these conditions is in the order of 7.6 mm. FIG. 13D shows the point spread function at a range of 0.7 m on centre in elevation and a 0.6 m offset in azimuth taken along the x axis. As can be seen the beamwidth in this instance is in the order of 17.1 mm.

The method of signal processing described in relation to preferred embodiments of this invention allows images to be focussed at any distances in the near field and at frame rates which allow video images of walking subjects. It will also be appreciated from the foregoing description that very short sequences of simultaneous but differing, preferably orthogonal, transmissions allow a very fast data capture process, completing before any walking movement causes significant phase shifts in the data. In arrangements wherein the multiplicity of signals are grouped, processing time can be significantly reduced because the required phase shifts are applied to a sum only rather than signals from individual paths. This time reduction is also significant in enabling fast video-rate imaging.

At present the applicant is investigating the feasibility of constructing a hand held version of the imaging system according to the present invention. This particular unit could utilise a square array approximately 600 mm×600 mm having 64 elements disposed along each side and capable of transmitting at a frequency of 95 GHz.

It is to be understood that the above embodiments have been provided only by way of exemplification of this invention, and that further modifications and improvements thereto, as would be apparent to persons skilled in the relevant art, are deemed to fail within the broad scope and ambit of the present invention described herein.

The invention claimed is:

1. A radar imaging system for capturing an image of an object within an area of interest through at least one visual impairment, said system comprising:
    at least one radar array, said at least one radar array including:
        a plurality of transmitter elements that transmit a plurality of differently coded signals toward the object and said at least one visual impairment; and
        a plurality of receiver elements that receive a plurality of coded return signals reflected from the object through said at least one visual impairment; and
    at least one processor coupled to the plurality of transmitter elements and the plurality of receiver elements, said at least one processor being adapted to:
        decode the plurality of coded return signals reflected from the object through said at least one visual impairment;
        extract from the decoded plurality of coded return signals a multiplicity of captured signals for each transmitter to receiver path;
        align the multiplicity of captured signals to be substantially time coincident for each pixel point of an image of the object to be formed; and
        sum the aligned signals to produce the image of the object.

2. The radar imaging system of claim 1, wherein the plurality of transmitter elements periodically transmit a plurality of pulses, each pulse having a different signature code, to allow the plurality of receiver elements to separate out the plurality of coded return signals reflected from the object through said least one visual impairment, wherein the plurality of coded return signals are associated with the plurality of differently coded signals transmitted by each of the plurality of transmitter elements.

3. The radar imaging system of claim 2, wherein each signature code is formed from a sequence of carrier frequencies selected from a set of predetermined frequencies.

4. The radar imaging system of claim 2, wherein the plurality of transmitter elements transmit the plurality of pulses in accordance with a frequency division multiplexing (FDM) scheme, wherein each pulse of the plurality of pulses comprises a carrier frequency selected from a set of predetermined frequencies, allowing the plurality of receiver elements to separate out the plurality of coded return signals reflected from the object through said least one visual impairment.

5. The radar imaging system of claim 4, wherein the carrier frequency of at least one of the plurality of pulses is cycled incrementally after each transmission, such that each of the plurality of transmitter elements transmits a full set of pulses covering the set of predetermined frequencies.

6. The radar imaging system of claim 5, wherein the transmission of the plurality of pulses is staggered, whereby each of the plurality of transmitter elements transmits a different carrier frequency within the full set of pulses to that of an adjacent transmitter element.

7. The radar imaging system of claim 5, wherein the full set of pulses comprises a number of frequency steps L that is equal to or greater than the number of transmitter elements N in the plurality of transmitter elements.

8. The radar imaging system of claim 7, wherein the plurality of receiver elements are arranged such that each receiver element captures L×M sequences of pulses, where M is the number of receiver elements in the plurality of receiver elements.

9. The radar imaging system of claim 4 wherein the plurality of pulses are transmitted in accordance with an orthogonal frequency division multiplexing (OFDM) scheme.

10. The radar imaging system of claim 4, wherein a constant frequency separation is maintained between the carrier frequencies of each of the plurality of pulses.

11. The radar imaging system of claim 2, wherein a pulse compression is employed.

12. The radar imaging system of claim 1, wherein the plurality of transmitter elements transmit a plurality of pulses utilising a code division multiplexing scheme, whereby each of the plurality of transmitter elements simultaneously transmits a coded pulse of substantially the same frequency to allow the plurality of receiver elements to separate out the plurality of coded return signals reflected from the object through said least one visual impairment.

13. The radar imaging system of claim 12, wherein each pulse of the plurality of pulses is coded with a different phase or amplitude modulation.

14. The radar imaging system of claim 1, wherein the visual impairment includes an article of clothing.

15. The radar imaging system of claim 1, wherein the visual impairment includes an environmental phenomenon.

16. The radar imaging system of claim 15, wherein the environmental phenomena is selected from one of the following: a low visible light, complete darkness, a cloud of particulates, smoke, or a vapour cloud.

17. A method for capturing an image of an object within an area of interest through at least one visual impairment, said method comprising:
- transmitting a plurality of coded signals toward the area of interest;
- receiving a plurality of coded return signals reflected from the object through said least one visual impairment;
- decoding the received plurality of coded return signals;
- extracting from the decoded plurality of coded return signals a multiplicity of captured signals for each transmitter to receiver path;
- aligning the multiplicity of captured signals to be substantially time coincident for each pixel point of an image of the object to be formed; and
- summing the aligned signals to produce the image of the object.

18. The method of claim 17, wherein the transmitting the plurality of coded signals comprises periodically transmitting a plurality of pulses, each pulse having a different signature code to allow a plurality of receiver elements to separate out the plurality of coded return signals reflected from the object through said least one visual impairment.

19. The method of claim 18, wherein each signature code is formed from a sequence of carrier frequencies selected from a set of predetermined frequencies.

20. The method of claim 18, wherein pulse compression is employed.

21. The method of claim 17, wherein the transmitting the plurality of coded signals comprises transmitting a plurality of pulses utilising a code division multiplexing scheme, whereby each of a plurality of transmitter elements simultaneously transmits a coded pulse of substantially the same frequency as an adjacent transmitter element, allowing a plurality of receiver elements to separate out the plurality of coded return signals reflected from the object through said least one visual impairment.

22. The method of claim 21, wherein each pulse of the plurality of coded pulses is coded with a different phase or amplitude modulation.

23. The method of claim 17, wherein the transmitting the plurality of coded signals comprises transmitting a plurality of pulses in accordance with a frequency division multiplexing (FDM) scheme, wherein each pulse of the plurality of pulses comprises a carrier frequency selected from a set of predetermined frequencies, allowing a plurality of receiver elements to separate out the plurality of coded return signals reflected from the object through said least one visual impairment associated.

24. The method of claim 23, wherein the carrier frequency of at least one of the plurality of pulses is cycled incrementally after each transmission, such that each one of a plurality of transmitter elements transmits a full set of pulses covering the set of predetermined frequencies.

25. The method of claim 24, wherein the transmitting the plurality of coded signals comprises staggering transmission of the pulses, whereby each one of the plurality of transmitter elements transmits a pulse comprising a different carrier frequency to that of an adjacent transmitter element.

26. The method of claim 24, wherein the full set of pulses comprises a number of frequency steps L that is equal to or greater than the number of transmitter elements N in the plurality of transmitter elements.

27. The method of claim 26, wherein the plurality of receiver elements are arranged such that each receiver element captures L×M sequences of pulses, where M is the number of receiver elements in the plurality of receiver elements.

28. The method of claim 23, wherein the plurality of pulses are transmitted in accordance with an orthogonal frequency division multiplexing (OFDM) scheme.

29. The method of claim 23, wherein a constant frequency separation is maintained between the carrier frequencies of each of the plurality of pulses.

30. The method of claim 17, wherein the visual impairment comprises an article of clothing.

31. The method of claim 17, wherein the visual impairment comprises an environmental phenomenon.

32. The method of claim 31, wherein the environmental phenomenon is selected from the following: a low visible light, complete darkness, a cloud of particulates, smoke, or a vapour cloud.

33. A computer readable media containing sequences of instructions that, when executed on one or more processors, cause said processors to undertake the method of claim 17.

* * * * *